(12) United States Patent
Banevicius et al.

(10) Patent No.: US 10,556,983 B2
(45) Date of Patent: *Feb. 11, 2020

(54) PROCESS FOR THE PREPARATION OF SILYLATED POLYMERS HAVING LOW COLOR AND COLOR STABILITY

(71) Applicant: Momentive Performance Materials Inc., Waterford, NY (US)

(72) Inventors: John Banevicius, Clifton Park, NY (US); Misty Huang, New City, NY (US); Brendan O'Keefe, Parkersburg, WV (US); Vikram Kumar, Tarrytown, NY (US); Bruce Barbera, Sleepy Hollow, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,039

(22) Filed: Oct. 17, 2018

(65) Prior Publication Data

US 2019/0112415 A1    Apr. 18, 2019

Related U.S. Application Data

(62) Division of application No. 14/823,580, filed on Aug. 11, 2015, now Pat. No. 10,138,324.

(51) Int. Cl.
| | |
|---|---|
| *C08G 18/83* | (2006.01) |
| *C08G 18/48* | (2006.01) |
| *C08G 18/71* | (2006.01) |
| *C08G 18/80* | (2006.01) |
| *C08G 18/08* | (2006.01) |
| *C08G 18/10* | (2006.01) |
| *C08G 18/28* | (2006.01) |

(Continued)

(52) U.S. Cl.
CPC ....... *C08G 18/837* (2013.01); *C08G 18/0895* (2013.01); *C08G 18/10* (2013.01); *C08G 18/289* (2013.01); *C08G 18/2855* (2013.01); *C08G 18/4825* (2013.01); *C08G 18/718* (2013.01); *C08G 18/8074* (2013.01); *C08G 2190/00* (2013.01); *C08K 5/1345* (2013.01); *C08K 5/524* (2013.01)

(58) Field of Classification Search
CPC .......................... C08G 18/837; C08G 18/8074
USPC ......................................................... 525/455
See application file for complete search history.

(56) References Cited

U.S. PATENT DOCUMENTS

| | | |
|---|---|---|
| 3,829,505 A | 8/1974 | Herold |
| 3,905,929 A | 9/1975 | Noll |
| 3,941,849 A | 3/1976 | Herold |

(Continued)

FOREIGN PATENT DOCUMENTS

WO    2015046453    4/2015

OTHER PUBLICATIONS

International Search Report and Written Opinion dated Oct. 12, 2016 from PCT/US2016/044414.

*Primary Examiner* — Michael M Dollinger
(74) *Attorney, Agent, or Firm* — James C. Abruzzo

(57) ABSTRACT

A batch or continuous process for preparing silylated polymers having low color and color stability comprising silylating a prepolymer having reactive functional groups with a silylating agent and optionally quenching the silylated polymer, where a stabilizer package containing at least one phosphite stabilizing agent is used.

22 Claims, 5 Drawing Sheets

Continuous Process including Silylation and Stabilization Steps where the Stabilization Step is carried out in a Tubular Reaction Unit

(51) Int. Cl.
*C08K 5/524* (2006.01)
*C08K 5/134* (2006.01)

(56) References Cited

U.S. PATENT DOCUMENTS

| | | |
|---|---|---|
| 4,005,056 A | 1/1977 | Dunwald et al. |
| 4,242,490 A | 12/1980 | Emerson et al. |
| 4,335,188 A | 6/1982 | Keishiro et al. |
| 4,687,851 A | 8/1987 | Laughner |
| 4,985,491 A | 1/1991 | Reisch |
| 5,096,993 A | 3/1992 | Smith |
| 5,100,997 A | 3/1992 | Reisch et al. |
| 5,106,874 A | 4/1992 | Porter et al. |
| 5,116,931 A | 5/1992 | Reisch et al. |
| 5,136,010 A | 8/1992 | Reisch et al. |
| 5,185,420 A | 2/1993 | Smith et al. |
| 5,266,681 A | 11/1993 | Reisch et al. |
| 5,990,257 A | 11/1999 | Johnston et al. |
| 6,288,198 B1 | 9/2001 | Mechtel et al. |
| 6,512,033 B1 | 1/2003 | Wu |
| 6,827,875 B2 | 12/2004 | Schelhaas et al. |
| 7,435,787 B2 | 10/2008 | Banevicius et al. |
| 7,732,554 B2 | 6/2010 | O'Keefe et al. |
| 8,101,704 B2 | 1/2012 | Baumann et al. |
| 9,828,459 B2 | 11/2017 | Banevicious et al. |
| 2007/0060735 A1 | 3/2007 | Banevicius et al. |
| 2007/0100108 A1 | 5/2007 | Huang et al. |
| 2008/0076899 A1 | 3/2008 | O'Keefe et al. |
| 2011/0077375 A1 | 3/2011 | Kulke et al. |
| 2011/0237734 A1* | 9/2011 | Ramakrishnan ........ C08L 75/04 524/500 |
| 2011/0237740 A1* | 9/2011 | Iyer ..................... C08G 18/10 524/590 |
| 2012/0028020 A1* | 2/2012 | Utesch .................. C08G 18/10 428/220 |
| 2016/0208146 A1 | 7/2016 | Arai et al. |

\* cited by examiner

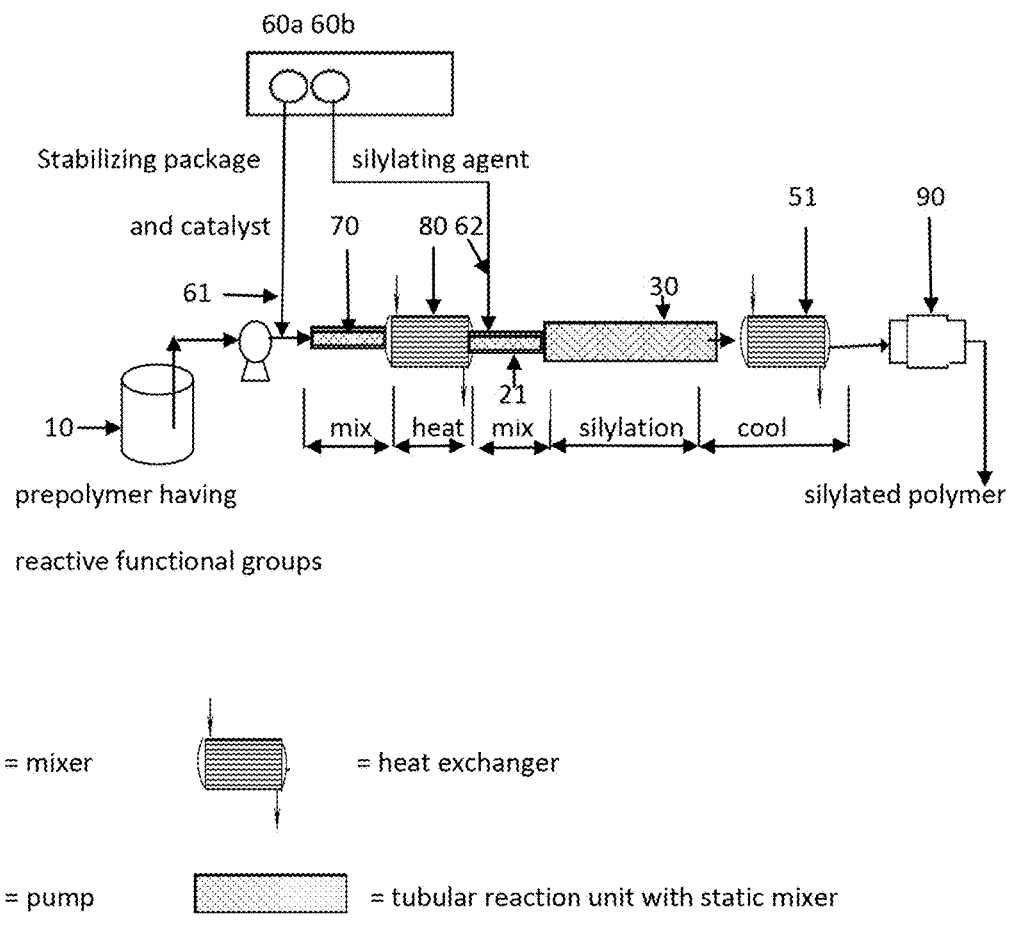
Figure 1. Continuous Process including Silylation and Stabilization Steps where the Stabilization Step is carried out in a Tubular Reaction Unit

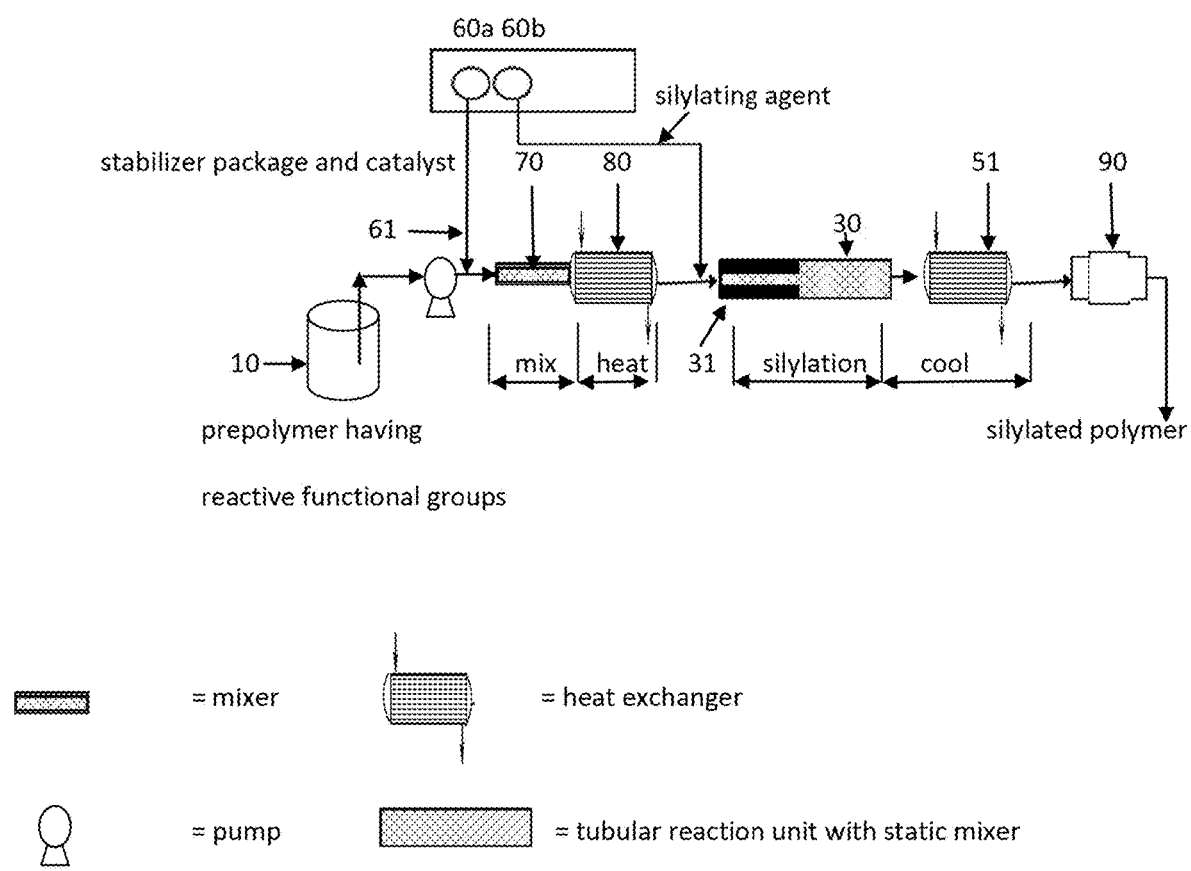
Figure 2. Continuous Process including Silylation and Stabilization Steps where the Stabilization Step is carried out in a Variable Diameter Tubular Silylation Unit

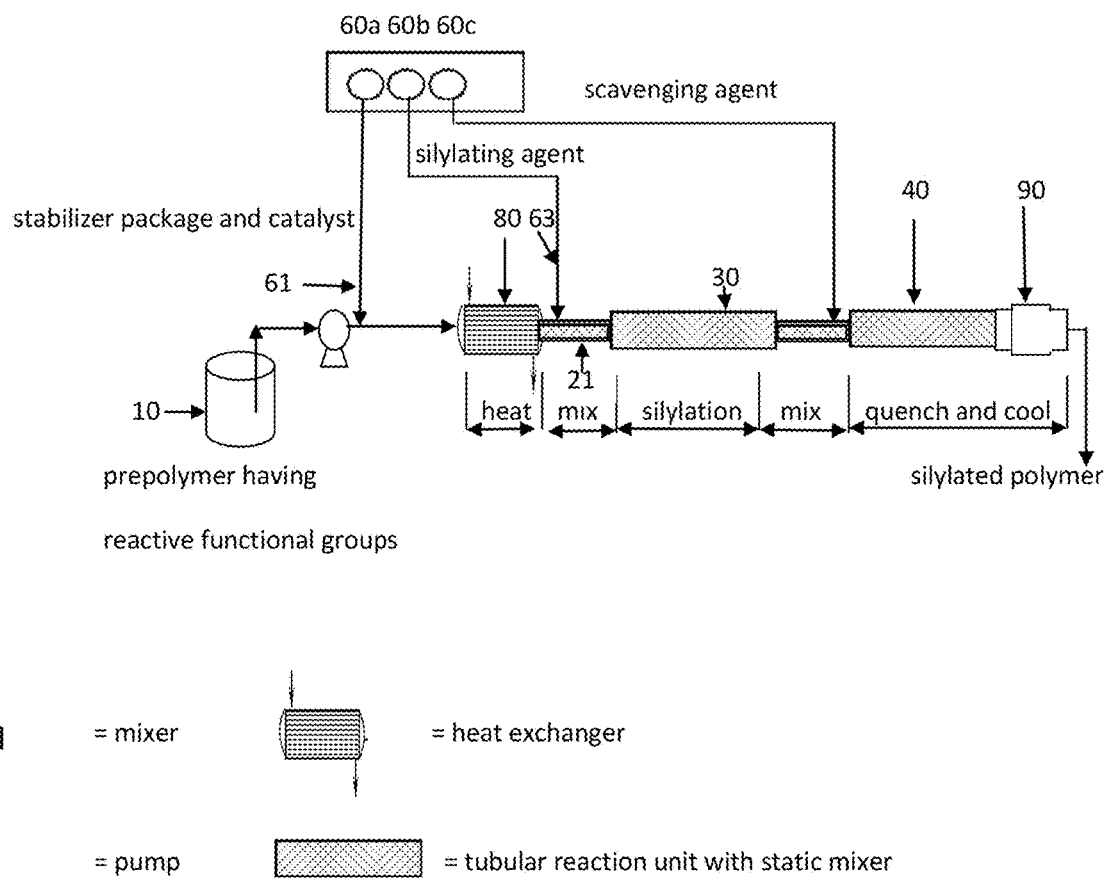
Figure 3. Continuous Process including Silylation, Stabilization and Quenching Steps.

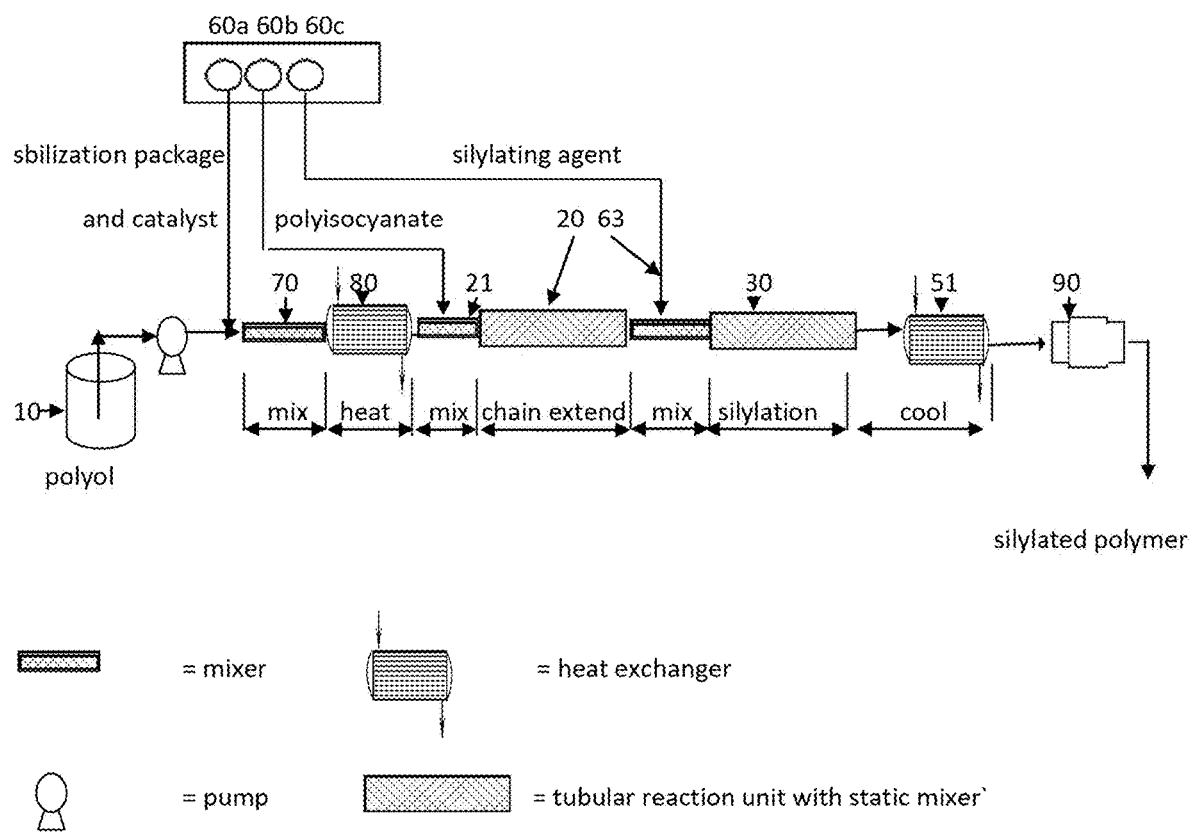
Figure 4. Continuous Process including Silylation, Stabilization and Chain Extension Steps

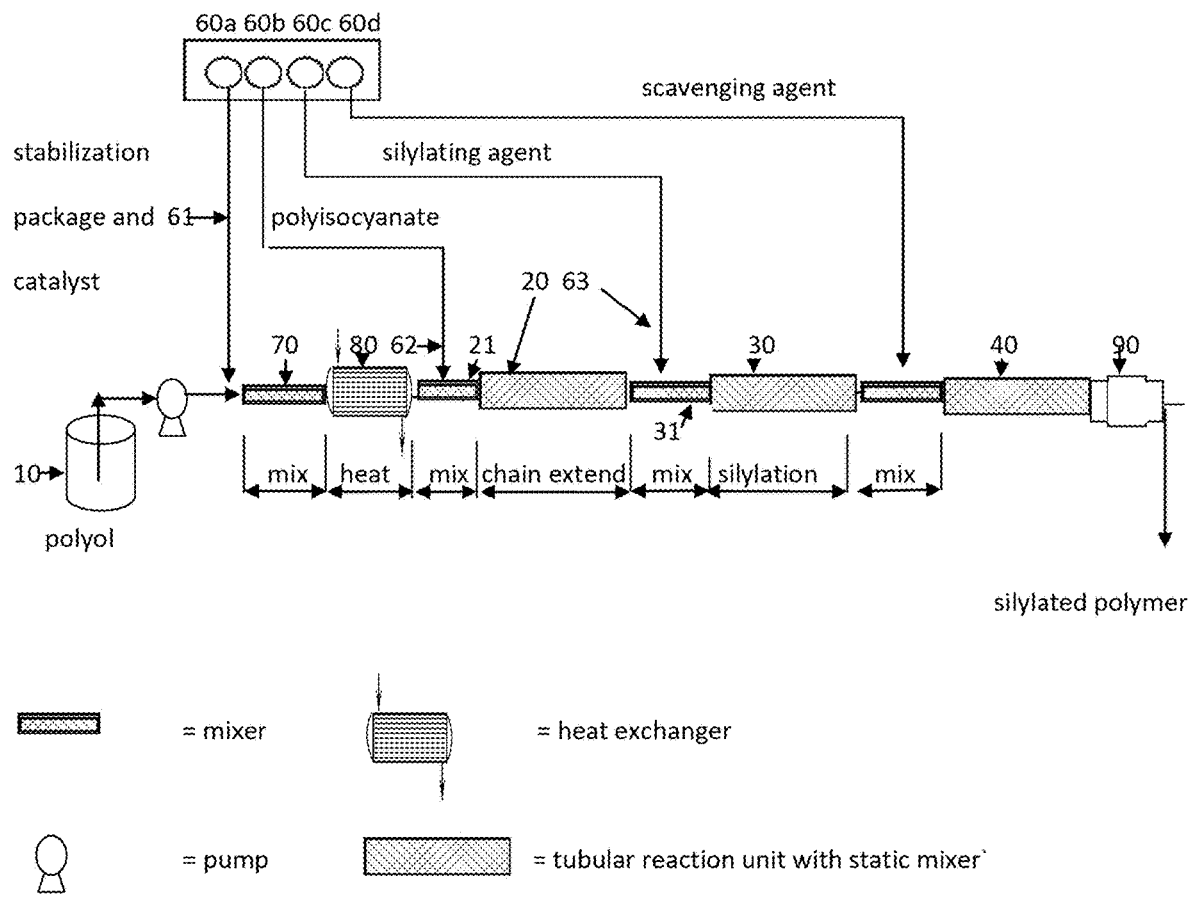
Figure 5. Continuous Process including Silylation, Stabilization, Chain Extension and Quenching Steps

PROCESS FOR THE PREPARATION OF SILYLATED POLYMERS HAVING LOW COLOR AND COLOR STABILITY

This application is a divisional of U.S. patent application Ser. No. 14/823,580, filed Aug. 11, 2015, the entire contents of which are incorporated herein by reference in its entirety.

FIELD OF INVENTION

Disclosed herein is a process for the preparation of silylated polymers, specifically silylated polymers having low color and color stability and even more specifically, silylated polymers which are moisture-curable silylated polyurethane polymers having low color and color stability.

BACKGROUND OF THE INVENTION

In the field of polymer production, silylated polymers are generally known to be useful as components of coatings, adhesives, sealants and other elastomeric products. The production of these silylated polymers can be by a continuous or batch process and generally includes a silylation step, where a prepolymer is reacted with a silylating agent in a silylation reaction to produce a silylated polymer composition. Often times, this silylation reaction does not proceed to completion. An incomplete silylation reaction usually leads to deterioration in the produced silylated polymer. For example, the more incomplete the silylation reaction, the more unreacted reactive groups will remain in the silylated polymer composition. These unreacted reactive groups continue to react in the silylated polymer composition. Properties observed immediately after the formation of the silylated polymer composition do not remain constant. For example, reaction of the unreacted reactive groups over time can cause viscosity creep which changes the viscosity of the produced silylated polymer over time. This change in viscosity will be referred to herein as viscosity creep.

While there have been valiant attempts to adjust the silylation reaction by adding excess amounts of silylation agent to the silylation step, this is costly and often still does not lead the reaction to completion. Other attempts to drive the reaction further to completion have been tried by adjusting reaction conditions or process parameters in a reaction unit used in the silylation step. However, this is particularly problematic in continuous processes where the efficiency of the process requires a continuous feeding from upstream reaction units to downstream reaction units.

Another drawback of these processes is that the components in the produced silylated polymer composition that have unreacted reactive functional groups will function similarly to plasticizers. In this regard, they produce deteriorations in the mechanical properties of the silylated polymer composition, that would otherwise not be present or be present to a lesser degree. For example, the components with unreacted reactive functional groups cause a comparative reduction in tensile strength, shore hardness, elongation and modulus, relative to compositions without these unreacted reactive functional groups.

The unreacted reactive groups also contribute to variability in the produced silylated polymer compositions. This variability adds unwanted processing costs and losses for the manufacturer and for the consumer. It also results in unfavorable consumer opinions as consumers are likely to feel less confident that the produced moisture-curable silylated polymer meets their desired specifications.

Another approach has been to use scavenging agents to quench the unreacted reactive groups. However, many of these scavenging agents have low flash points and are consequently ineffective at the high process temperatures used in the process for preparing silylated polymers.

Silylated polymers produced by conventional processes often suffer other drawbacks as well. For example, the silylated polymer often suffers from color deterioration or a color change over time. This is problematic because this affects the performance of the polymers in some applications where particular colors or lack of color is important.

There remains a need in the art for a process for producing a silylated polymer without the drawbacks discussed above.

SUMMARY OF THE INVENTION

Disclosed herein is the surprising finding that the above-discussed color deterioration, observed in conventional processes, can be improved by the incorporating of a stabilization step wherein a stabilization package is incorporated into the process. Moreover, the color deterioration can be improved by incorporating the stabilization step early in the process. Also disclosed herein is the surprising finding that the above-discussed deterioration of the viscosity and mechanical properties of the produced silylated polymer can be improved by incorporating a quenching step. In the incorporated quenching step a scavenging package is incorporated into the process.

In one embodiment, the process for the preparation of a silylated polymer comprises reacting a prepolymer with a silylating agent, by a silylation reaction, to produce a silylated polymer composition; and adding a stabilization package containing a phosphite stabilizer to the process before the silylation reaction, to the silylation reaction or after the silylation reaction. Although the process may be a batch process or a continuous process, where the process is a continuous process, the process does not include backmixing of at least a portion of the silylated polymer composition.

Accordingly, in one aspect, the process is a continuous process comprising a silylation step in silylating unit which is an endcapping tubular reaction unit without backmixing and, optionally, at least one of a stabilization step and/or a quenching step.

BRIEF DESCRIPTION OF THE FIGURES

FIG. 1 is a diagram of an embodiment of the continuous process for producing a silylated polymer with a stabilizing step and a silylating step which mixes a stabilization package with a prepolymer containing reactive functional groups and transports the stabilized prepolymer containing reactive functional groups to a mixer containing the silylating agent which mixes and transports the mixture to inlet of the endcapping tubular reaction unit and an upstream temperature controlling step using a heat exchanger unit.

FIG. 2 is a diagram of an embodiment of the continuous process for producing a silylated polymer where the process comprises a silylating step and a stabilization step which mixes a stabilization package with a prepolymer containing reactive functional groups and transports the stabilized prepolymer containing reactive functional groups to a mixer containing the silylating agent which mixes and transports the mixture to inlet of the endcapping tubular reaction unit and an upstream temperature controlling step using a heat exchanger unit and where the endcapping tubular reaction unit has a variable diameter reaction chamber.

FIG. 3 is a diagram of an embodiment of the continuous process for producing a silylated polymer with a stabilizing step, a silylating step and a quenching step which mixes a stabilization package with a prepolymer containing reactive functional groups and transports the stabilized prepolymer containing reactive functional groups to a mixer containing the silylating agent which mixes and transports the mixture to inlet of the endcapping tubular reaction unit and an upstream temperature controlling step using a heat exchanger unit, an upstream temperature controlling step using a heat exchanger unit and a downstream quenching step.

FIG. 4 is a diagram of an embodiment of the continuous process for producing a silylated polymer with a silylating step, an upstream stabilization step, upstream heat exchanger, upstream chain extension unit, and downstream cooling unit.

FIG. 5 is a diagram of an embodiment of the continuous process for producing a silylated polymer with a silylating step, an upstream stabilization step, upstream heat exchanger, upstream chain extension unit and downstream quenching and cooling unit.

DETAILED DESCRIPTION

Preparation of the silylated polymer can be by a batch process or a continuous process. In a batch process a reaction chamber is provided for the silylation step. The reactants, such as a prepolymer and a silylating agent, are reacted to produce a silylated polymer composition, subject to incorporation of at least one of the stabilization step and optionally, a quenching step (scavenging step). The silylated polymer is then removed from the reaction equipment for storage or further incorporation into a coating, adhesive or sealant product. In one embodiment, the silylated polymer is a moisture-curable silylated polyurethane polymer. As to the stabilization step, the stabilization package can be added to reactants before they are added to the reaction chamber, added directly to the reaction chamber along with the other reactants, added to the produced silylated polymer composition, added to the removed silylated polymer or subsequently incorporated into a final product using the silylated polymer. As to the quenching step (scavenging step), the scavenging package is added into the reaction chamber or is added to the produced silylated polymer composition.

While the process may be a batch or continuous process, it is preferred that the process is a continuous process. Advantages of a continuous process include, for example, the ease in application to high volume production and scale-up operations. Moreover, the efficiency of the process can be improved. In a continuous process, a reaction chamber is provided for the silylation step. The reactants, such as a prepolymer containing reactive functional groups and a silylating agent, are reacted to produce a silylated polymer composition, subject to incorporation of at least one of the stabilization step and optionally a the quenching step. In the continuous process, the process chamber for the silylation step is a silylation unit having an inlet for receiving a reactant and an outlet for exuding a reaction product. In the continuous process the reaction product of the silylation reaction (i.e., the silylated polymer composition) will be referred to herein as the second intermediate product. As used herein, the term second intermediate product is interchangeable with the silylated polymer composition product produced from the silylation reaction. In this respect, the second intermediate product contains fully silylated polymers and partially silylated polymers. In the fully silylated polymers the terminal reactive functional groups are silylated whereas in a partially silylated polymer at least one of the terminal reactive functional groups is not silylated. The prepolymer having reactive functional groups will be referred to herein as a first intermediate product. The silylation unit is preceded by upstream process chambers that operate in series or parallel relative to each other to feed reactants into the silylation unit. The silylation unit also feeds the silylated polymer composition downstream towards process chambers that operate in series with the silylation unit. These downstream process chambers, relative to each other, also operate in series or in parallel. The upstream and downstream process chambers may be optionally present and may be present in various combinations with the silylation unit.

The silylation step, whether in a batch or continuous process, comprises a silylation reaction without backmixing wherein a prepolymer having reactive functional groups is reacted with a silylating agent. The term backmixing as used herein refers to the use of a backmixing means, such as a backmixing loop, to remove at least a portion of the silylated polymer composition from a downstream point in the process to an upstream point in the process. For example, this includes using a backmixing loop to remove at least a first portion of the silylated polymer composition from an outlet of an endcapping tubular reactor to an inlet of the endcapping tubular reactor.

The first intermediate product suitable for this process step are those containing reactive functional groups that are reactive with the silylating agent to produce a silylated polymer. As noted above, the silylated polymer composition, as a second intermediate product, contains the silylated polymer. In instances where the silylation reaction does not proceed to completion, the second intermediate product is a partially silylated polymer composition. A partially silylated polymer composition comprises unreacted reactive functional groups which are attributable to the prepolymer having reactive functional groups, the silylating agent or other components present in the silylation step. These unreacted reactive functional groups function to deteriorate the viscosity and mechanical properties of the silylated polymer over time.

Various prepolymers will be readily apparent to those of ordinary skill in the art. For example, prepolymers having reactive functional groups are preferred. More preferred, the prepolymer has terminal reactive functional groups. These prepolymers may be polyols, polyols extended by a chain extension reaction to produce chain extended prepolymers and polyurethanes having terminal isocyanate groups are examples of suitable prepolymers having reactive functional groups. In the process, these individually function as a first intermediate product and are reacted with the silylating agent in the silylation reaction.

Reactive functional groups as used herein refer to reactive moieties attached, directly or by a linker to a carbon atom of the prepolymer backbone. While reactive functional groups may be present at various pendant and terminal positions on the prepolymer backbone, for purposes of this process, it is preferred that the prepolymer has terminal reactive functional groups. These reactive functional groups include, for example, hydroxyl groups, amino groups, mercapto groups, isocyanate groups, or a mixture thereof, and more specifically hydroxyl groups, isocyanate groups, or a mixture thereof.

Various polyols are suitable for use in the instant process. These polyols preferably have terminal hydroxyl groups as the reactive functional groups.

While the first intermediate product can be a polyol, it is also contemplated within the scope of this disclosure that the first intermediate product is a chain extended polyol prepolymer having reactive functional groups. The chain extended prepolymer having reactive functional groups is produced by a chain extension reaction wherein a polyol is reacted with a chain extension agent. In one embodiment, the chain extended prepolymer having reactive functional groups is produced from the reaction of a polyol having terminal hydroxyl groups with a chain extension agent.

Various chain extension agents will be apparent to those of ordinary skill in the art. However, in preferred embodiments, the chain extension agent comprises a reactive group that is reactive with the reactive functional groups of the first intermediate product. In one embodiment, the chain extended prepolymer having reactive functional groups is produced from the reaction of a polyol having terminal hydroxyl groups and a chain extension agent having two or more isocyanate groups as the reactive group. Chain extended prepolymers having reactive functional groups produced from this reaction may have terminal reactive functional groups that are hydroxyl, isocyanate, or both. These resulting functional groups depend on the relative amounts of the polyol and the isocyanate bearing chain extension agent. Where the amount of polyol provides an excess of hydroxyl groups in the chain extension reaction, relative to the amount of isocyanate groups provided by the chain extension agent, the resulting chain extended prepolymer will contain hydroxyl groups as the terminal reactive functional groups. A molar excess of polyol in the chain extension reaction produces an OH:NCO molar ratio greater than 1:1. In more specific embodiments the OH:NCO molar ratio ranges from about 1.1:1 to about 10:1, even more specifically, from about 1.5:1 to about 3:1, and still even more specifically from about 1.8:1 to about 2.2:1. However, where the amount of chain extension agent provides an excess of isocyanate groups in the chain extension reaction, relative to the amount of hydroxyl groups provided by the polyol, then the resulting chain extended prepolymer having reactive functional groups will contain isocyanate groups as the terminal reactive functional groups. A molar excess of polyisocyanate in the chain extension reaction produces an OH:NCO molar ratio less than 1:1. In more specific embodiments the OH:NCO molar ratio ranges from about 0.1:1 to about 0.9:1, even more specifically, from about 0.3:1 to about 0.7:1, and still even more specifically from about 0.45:1 to about 0.55:1.

In one embodiment, where it is desired to have a chain extended polyol where the reactive functional groups are a mix of both terminal hydroxyl and terminal isocyanate groups, the chain extended polyol can be produced by mixing a stoichiometric molar amount of polyol with the polyisocyanate, a molar excess of polyol with the polyisocyanate, or a molar excess of polyisocyanate with the polyol and not to allow the reaction of the polyol and polyisocyanate to proceed to completion to produce the prepolymer having terminal hydroxyl and isocyanate functional groups, as the first intermediate product. A stoichiometric equivalent, molar excess of polyol or molar excess of polyisocyanate in the chain extension reaction produces which is not allowed to go to completion produces a first intermediate where the OH:NCO molar ratio is close to 1:1. In more specific embodiments the OH:NCO molar ratio ranges from about 0.5:1 to about 1.5:1, and even more specifically, from about 0.9:1 to about 1.1:1.

Chain extended prepolymers prepared by the reaction of hydroxyl-terminated prepolymers with di- or polyisocyanates may contain residual isocyanate, either from partially reacted di- or polyisocyanate, or from unreacted di- or polyisocyanate. In still another embodiment, the molecular weight of the polyols can be increased by reacting them and low molecular weight glycols, triols or higher functionality alcohols, di- or polyamines, polysiloxanes containing pendent and/or terminal hydroxyl or amino groups with di- or polyisocyanates. In one embodiment, the molar ratio of hydroxyl groups to isocyanate groups (OH:NCO) is specifically from about 1.01:1 to about 3:1 and more specifically from about 1.05:1 to about 1.50:1.

Polyols suitable for use as the first intermediate product or for forming the chain extended prepolymer having reactive functional groups include, for example, those with terminal hydroxyl groups as the reactive functional groups. Suitable hydroxyl-terminated polyols include polyether polyols, polyester polyols such as the hydroxyl-terminated polycaprolactones, polyetherester polyols such as those obtained from the reaction of polyether polyol with ε-caprolactone, polyesterether polyols such as those obtained from the reaction of hydroxyl-terminated polycaprolactones with one or more alkylene oxides such as ethylene oxide and propylene oxide, hydroxyl-terminated polybutadienes and hydroxyl-terminated polyurethane prepolymers derived therefrom, e.g., by the reaction of a slight excess of one or a mixture of said polyols with one or a mixture of polyisocyanates. The polyols may also include polyesteramides, polyethers, polythioethers, polycarbonates, and polyacetals. Where appropriate, the polyols may contain free tertiary amino groups.

Some specific suitable polyols include the polyether diols, in particular, the poly(oxyethylene)diols, the poly(oxypropylene)diols and the poly(oxyethylene-oxypropylene)diols, polyoxyalkylene triols, polytetramethylene glycols, polyacetals, polyhydroxy polyacrylates, polyhydroxy polyester amides and polyhydroxy polythioethers, polycaprolactone diols and triols, and the like.

In one embodiment of the present invention, the polyols used in the production of the silylated polymers, specifically moisture-curable silylated polyurethane polymers, are poly(oxyethylene)diols with number average molecular weights from about 500 to about 25,000 grams per mole (g/mol). In another embodiment of the present invention, the polyols used in the production of the silylated polymers, specifically moisture-curable silylated polyurethane polymers, are poly(oxypropylene)diols with number average molecular weights from about 1,000 to about 20,000 grams per mole. Mixtures of polyols of various structures, molecular weights and/or functionalities can also be used.

In one embodiment, the number average molecular weight of the polyols is calculated from the hydroxyl number of the polyol and the functionality of the polyol. The hydroxyl number of the polyol is determined in accordance with ASTM D4274-11, Standard Test Methods for Testing Polyurethane Raw Materials: Determination of Hydroxyl Numbers of Polyols.

Other polyether polyols which may be used include products obtained by the polymerisation of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylolpropane, pentaerythritol or Bisphenol A. Especially useful polyethers include polyoxypropylene diols and triols, poly(oxyethylene-oxypropylene) diols and triols obtained by the simultaneous or sequential addition of ethylene and propylene oxides to appropriate initiators and polytetramethylene ether glycols obtained by the polymerisation of tetrahydrofuran.

Polyethers containing free tertiary amino groups may be obtained by the oxyalkylation, for example oxypropylation, of ammonia, primary or secondary amines and aminoalcohols. Examples of suitable amines include ethylene diamine, aniline, benzylamine, toluene diamines, diaminodiphenylmethane and polymethylene polyphenyl polyamines. Suitable aminoalcohols include ethanolamine, diethanolamine, triethanolamine, N-methyldiethanolamine, bis-(2-hydroxyethyl)aniline, bis-(2-hydroxypropyl)aniline and bis-(2-hydroxyethyl)benzylamine. In the oxyalkylation process, mixtures of amino-containing and amino-free initiators may be used if desired.

Polythioether polyols are also suitable polyols. These include, for example, products obtained by condensing thiodiglycol either alone or with other glycols, dicarboxylic acids, formaldehyde, aminoalcohols or aminocarboxylic acids.

Polycarbonate polyols are also suitable polyols. These include, for example, products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols are also suitable polyols. These include, for example, glycols such as diethylene glycol, triethylene glycol and hexanediol with formaldehyde. Suitable polyacetals may also be prepared by polymerising cyclic acetals.

Suitable polyolefin polyols include, for example, hydroxyl-terminated butadiene homo- and copolymers.

Diols having pendent polyoxyethylene chains which may be used in the preparation of the prepolymer include those described in U.S. Pat. No. 3,905,929, for example, the entire contents of which are incorporated here by reference.

Suitable polyester polyols include, for example, hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol or mixtures thereof with polycarboxylic acids, especially dicarboxylic acids or their ester-forming derivatives, for example succinic, glutaric and adipic acids or their dimethyl esters, phthalic anhydride or dimethyl terephthalate. Polyesters obtained by the polymerisation of lactones, for example caprolactone, in conjunction with a polyol may also be used. Polyesteramides may be obtained by the inclusion of amino-alcohols such as ethanolamine in polyesterification mixtures. Polyesters containing free tertiary amino groups may be obtained by including tertiary amino polyols, for example triethanolamine or N-methyldiethanolamine in the polyesterification reaction.

The polyether polyols can have up to about 5 hydroxyl groups per polymer chain and more specifically have a functionality of from about 1 to 2 hydroxyl groups per polymer chain and most specifically, a functionality of about 2 hydroxyl groups per polymer chain (i.e., diols). Especially suitable are the polyether polyols prepared in the presence of double-metal cyanide (DMC) catalysts, an alkaline metal hydroxide catalyst, or an alkaline metal alkoxide catalyst; see, for example, U.S. Pat. Nos. 3,829,505; 3,941,849; 4,242,490; 4,335,188; 4,687,851; 4,985,491; 5,096,993; 5,100,997; 5,106,874; 5,116,931; 5,136,010; 5,185,420; and 5,266,681, the entire contents of which are incorporated here by reference. Polyether polyols produced in the presence of double-metal cyanide catalysts tend to have high molecular weights and low levels of unsaturation, properties of which, it is believed, are responsible for the improved performance. The polyether polyols specifically have a number average molecular weight of from about 1,000 to about 25,000 grams per mole, more specifically from about 2,000 to about 20,000 grams per mole, and even more specifically from about 4,000 to about 18,000 grams per mole. In one embodiment of the invention, the polyether polyols have an end group unsaturation level of no greater than about 0.04 milliequivalents per gram of polyol. In another embodiment of the invention, the polyether polyol has an end group unsaturation of no greater than about 0.02 milliequivalents per gram of polyol. The amount of unsaturation is determined in accordance with ASTM D4671-05(2010)e1, Standard Test Method for Polyurethane Raw Materials Determination of Unsaturation of Polyols.

In one embodiment, the prepolymer having reactive functional groups, as the first intermediate product, is of general Formula (1):

$$R^1(X)_a \qquad (1)$$

wherein $R^1$ is an organic group containing from 50 to 4,000 carbon atoms and at least one functional group selected from group consisting of —O—, —S—, —OC(=O)NH—, —R$^2$NC(=O)NH—, —C(=O)O—, —OC(=O)O—, —OCHR$^2$O—, —C(=O)NR$^2$—, —NR$^2$— and —CR$^2$=CHR$^2$$_2$, wherein each occurrence of R$^2$ is independently hydrogen, an alkyl group containing from 1 to 6 carbon atoms or phenyl, preferably hydrogen;

each occurrence of X is independently a reactive functional group selected from the group consisting of —OH, —SH, —NR$^3$H— and —N=C=O, wherein each occurrence of R$^3$ is independently hydrogen, an alkyl group of from 1 to 6 carbon atoms or phenyl, more specifically hydrogen; and the subscript a is an integer from 1 to 5, more specifically 2 or 3 and even more specifically 2.

In still another embodiment, the prepolymer containing reactive functional groups of Formula (1) more particularly have the structures selected from the group consisting of Formula (2), (3) and (4):

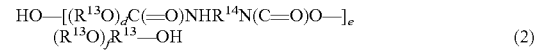

$$\text{HO}-[(R^{13}O)_dC(=O)NHR^{14}N(C=O)O-]_e(R^{13}O)_fR^{13}-\text{OH} \qquad (2)$$

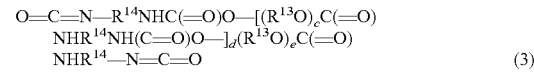

$$O=C=N-R^{14}NHC(=O)O-[(R^{13}O)_cC(=O)NHR^{14}NH(C=O)O-]_d(R^{13}O)_eC(=O)NHR^{14}-N=C=O \qquad (3)$$

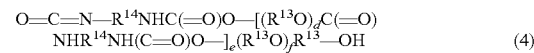

$$O=C=N-R^{14}NHC(=O)O-[(R^{13}O)_dC(=O)NHR^{14}NH(C=O)O-]_e(R^{13}O)_fR^{13}-OH \qquad (4)$$

wherein each occurrence of R$^{13}$ is independently selected from the group consisting of an alkylene group of from about 2 to about 10 carbon atoms, a cycloalkylene group of from about 5 to about 10 carbon atoms, arylene group of from about 6 to about 10 carbon atoms and aralkylene group of from about 7 to about 12 carbon atoms; each occurrence of R$^{14}$ is independently selected from the group consisting of an alkylene group of from about 1 to about 10 carbon atoms, a cycloalkylene group of from about 5 to about 12 carbon atoms, arylene group of from about 6 to about 10 carbon atoms, aralkylene group of from about 7 to about 12 carbon atoms; and the subscripts d, e and f are integers and each occurrence of d is from 1 to about 500, e is from 0 to about 5, and f is from 1 to about 500, with the proviso that (d)(e)+f is greater than or equal to about 25.

In yet another embodiment, the prepolymer having reactive functional groups is of Formula (2), (3) or (4) or mixtures thereof. In one particular embodiment, each $R^{13}$ is independently ethylene or propylene, preferably propylene, each $R^{14}$ is independently hexylene, methylphenylene or

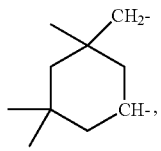

c is from about 100 to about 500, preferably from about 125 to about 225, d is 0, 1 or 2, preferably 0 or 1, e is from about 100 to about 500, preferably from about 125 to about 225.

Examples of commercially available polyols include the Arcol® polyol family and the Acclaim® polyol family of polyether polyol products which are used in a variety of urethane applications, such as, for example, adhesives, sealants, elastomers, molded foams and flexible foams.

In the instantly disclosed process, various chain extension agents are considered suitable. Polyisocyanates are preferred chain extension agents. Diisocyanates, or mixtures thereof, are particularly preferred. For example, the polyisocyanate can be diphenylmethane diisocyanate ("MDI"), polymeric diphenylmethane diisocyanate ("pMDI"), paraphenylene diisocyanate, naphthalene diisocyanate, liquid carbodiimide-modified MDI and derivatives thereof, isophorone diisocyanate (IPDI), dicyclohexylmethane-4,4'-diisocyanate, toluene diisocyanate ("TDI"), particularly the 2,6-TDI isomer, as well as various other aliphatic and aromatic polyisocyanates that are well-established in the art, and combinations thereof. In one embodiment of the invention the diisocyanate is at least one member selected from the group consisting of hexamethylene diisocyanate, phenylene diisocyanate, toluene diisocyanate, 4,4'-diphenylmethane diisocyanate and various isomers thereof, isophorone diisocyanate, dicyclohexylmethane diisocyanate, cyclohexane diisocyanate and 1,3-bis-(isocyanatomethyl)cyclohexane.

In one embodiment, the process includes a chain extension unit as an upstream process chamber. This chain extension unit is used for the chain extension reaction. The chain extension unit can be a batch kettle, a continuous stirred reactor unit or a tubular reaction unit. The chain extension unit is preferably a tubular reaction unit reactor having at least one inlet and at least one outlet. The at least one inlet receives the polyol and the chain extension agent into the chain extension tubular reaction unit. The polyol and chain extension agent are either mixed prior to introduction to the inlet of the chain extension tubular reaction unit or are introduced separately through two inlets where they are mixed in the chain extension tubular reaction unit. The mixing of the polyol and chain extension agent is optionally facilitated using a mixer, as for example a mixing screw, a static mixer or baffles attached to the tubular reaction unit. The polyol and the chain extension agent react in the tubular reaction unit to produce the chain extended prepolymer having reactive functional groups as the first intermediate product. The chain extended prepolymer having reactive functional groups is then continuously fed downstream through the chain extension tubular reaction unit and through the outlet of the chain extension tubular reaction unit. In a preferred embodiment, the chain extension unit feeds the chain extended prepolymer having reactive functional groups into the silylation unit, also known as the endcapping unit.

In one embodiment, the process includes a stabilization step whereby a stabilization package is incorporated into the process. The stabilization package includes at least one stabilization agent. The stabilization package may be added to various steps in the process including upstream and downstream process chambers. For example the stabilization package may be added to an upstream mixer, an upstream heat exchanger, an upstream chain extension unit, the silylation unit, a downstream quenching unit, a downstream cooling unit, a downstream storage unit or to a final product (i.e., adhesives) incorporating the silylated polymer.

It has been found that color deterioration of the prepolymer can be improved when the stabilization package is added early in the process. Accordingly, while the stabilization package may be added at various steps along the process, it is preferred that the stabilization package is added early in the process. For example, in one embodiment, the stabilization package is added to the first intermediate product, before the silylation step. Preferably, the stabilization package is added before the chain extension step, which produces the first intermediate product. Even more preferably, the stabilization package is added to the polyol before adjustment of the temperature in a heat exchanger, before reaction with the chain extension agent and/or before reaction with the silylating agent. In one embodiment, the stabilization package is added to the polyol in an upstream mixer, as for example a static mixer, a mechanical mixer or mixing tube equipped with baffles. The polyol is fed from a polyol reservoir by a metering pump with a flow meter and is directed into the mixer. The stabilization package is also fed into the mixer from a stabilization package reservoir. It is also contemplated that in other embodiments, the stabilization package is fed into the mixer with other process components, as for example, catalysts.

The stabilization package is mixed with the polyol to produce a stabilized polyol. The stabilized polyol functions in the instant process as the first intermediate product or it may be chain extended as described herein to form the chain extended prepolymer having reactive functional groups. This polyol or its resulting chain extended prepolymer having reactive functional groups functions as the first intermediate product.

In one embodiment, the stabilization package includes a sterically hindered phenol, a phosphite stabilizer or combinations thereof. It has been found that color deterioration of the prepolymer can be improved when the stabilization package includes a phosphite stabilizer. Accordingly, in a preferred embodiment, the stabilization package includes a phosphite stabilizer. In one embodiment, the stabilization package comprises a sterically hindered phenol and a phosphite stabilizer.

In one embodiment, the process comprises a stabilization package comprising a phosphite stabilizer and optionally a sterically hindered phenol where the stabilization package is incorporated into the instant process in an early process chamber. Preferably, the early process chamber is an upstream mixer into which the polyol is fed from a polyol reservoir. In other embodiments, the stabilization package is accompanied in the mixer by a catalyst.

When the stabilizing package is added early in the process, such as before the chain extension reaction or before the silylation reaction, the stabilizer package provides for low color silylated polymers, silylated polymer compositions and products containing them. In one embodiment, the stabilizing agent or stabilizer package produces silylated polymers and silylated polymer compositions with color less than 50 Pt—Co, more specifically less than 20 Pt—Co, and even more specifically less than 10 Pt—Co, as measured in accordance with ASTM D1209, Standard Test Method for Color of Clear Liquids (Platinum-Cobalt Scale). In one embodiment, the silylated polymer is a moisture-curable silylated polyurethane polymer.

In one non-limiting embodiment, the silylated polymer compositions produced by the process of the present invention has color stability which is defined as the change in the color, where the change in color is the color of the silylated polymer composition after the silylated polymer composition is aged at 80° C. for 4 days minus the color of the silylated polymer composition as produced. The color is determined in accordance with ASTM D1209-05, Standard Test Method for Color of Clear Liquids (Platinum-Cobalt Scale). The color stability of the silylated polymer composition is equal to or less than 40 Pt—Co, more specifically, less than 25 Pt—Co, and most specifically less than 20 Pt—Co. In one embodiment, the silylated polymer is a moisture-curable silylated polyurethane polymer.

The term "sterically hindered phenol", as used herein, refers to an organic compound in which a hydroxyl group is chemically bonded to an aromatic hydrocarbon carbon atom and in which the adjacent carbon atoms to the carbon containing the hydroxyl group are bonded to a primary, a secondary or—a tertiary carbon atom of an alkyl group more specifically a secondary or tertiary carbon atom, and even more specifically a tertiary carbon atom of an alkyl group. In an embodiment, sterically hindered phenol is an antioxidant useful in the invention and may be described by the general Formula (5):

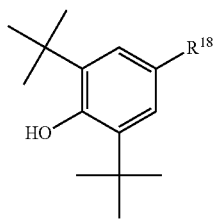

(5)

wherein each occurrence of $R^{18}$ is a monovalent or polyvalent organic radical of from 1 to about 50 carbon atoms and optionally containing substituents selected from group consisting of hydroxyl group, —OH; amide group, —C(=O)N(-)$_2$; ester group, —C(=O)O—; isocyanurate group

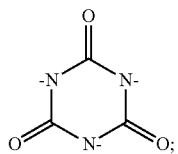

ether group, —O—; amine group, (-)$_2$NH; hydrazide, —C(=O)N(-)NH(-)$_2$—; sulfide group, —S—; and combinations thereof.

Specifically, the sterically hindered phenol antioxidant may have a molecular weight of between about 300 grams/mole to about 1,500 grams/mole. More specifically, the sterically hindered phenol antioxidant may contain at least two phenolic groups per molecule having the general Formula (6):

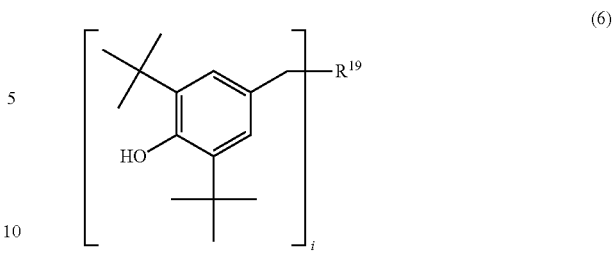

(6)

wherein $R^{19}$ is a divalent, trivalent or tetravalent organic group of from 1 to about 50 carbon atoms and optionally containing substituents selected from group consisting of a hydroxyl group, —OH; amide group, —C(=O)N(-)$_2$; ester group —C(=O)O—; isocyanurate group

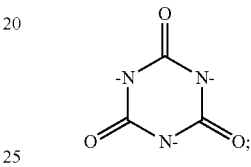

ether group, —O—; amine group, (-)$_2$NH; hydrazide, —C(=O)N(-)NH(-)$_2$—; sulfide group, —S—; and combination thereof; and the subscript i is an integer of from about 2 to about 4.

Representative and non-limiting examples of sterically hindered phenol antioxidants include 4-[[3,5-bis[(3,5-ditert-butyl-4-hydroxyphenyl)methyl]-2,4,6-trimethylphenyl]methyl]-2,6-ditert-butylphenol; octadecyl 3-(3,5-ditert-butyl-4-hydroxyphenyl)propanoate; 3-(3,5-ditert-butyl-4-hydroxyphenyl)-N'-[3-(3,5-ditert-butyl-4-hydroxyphenyl)propanoyl]propanehydrazide; ethylenebis(oxyethylene)bis-3,5-tert-butyl-4-hydroxy-m-tolyl)-propionate; pentaerythritol tetrakis(3-(3,5-di-tert-4-hydroxyphenyl)propionate; thiodiethylene bis[3-(3,5-di-tert-butyl-4-hydroxyphenyl)propionate-N,N'-hexane-1,6-diylbis(3-(3,5-di-tert-butyl-4-hydroxylphenylpropionamide); 1,3,5-tris-(3,5-di-tert-butyl-4-hydroxybenzyl)-1,3-5-triazine-2,4,6(1H,3H,5H—)-trione; 3,5-di-tert-buytl-4-hydroxy-toluene; 4,4-methylene-bis(3,5-di-tert-butylphenol); and mixtures thereof.

The phosphite processing stabilizer is an antioxidant that reacts with hydroperoxides or other color generating compounds that are formed during processing, prevents process induced degradation and optionally extends the performance of the sterically hindered phenol antioxidants. The phosphite stabilizer contains three oxygen phosphorus single bonds.

Specifically, the phosphite stabilizer has the general Formula (7)

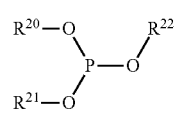

(7)

wherein
each occurrence of $R^{20}$ is independently selected from the group consisting of a monovalent hydrocarbon containing from 1 to about 25 carbon atoms, a monovalent hydrocarbon containing from 1 to about 25 carbon atoms and at least one heteroatom selected from the group consisting of oxygen atom, nitrogen atoms and sulfur atom, and a polyvalent hydrocarbon containing from 1 to about 25 carbon atoms in which at least one carbon atom is bonded to the oxygen of the oxygen-phosphorus group and at least one carbon atom is covalently bonded to a carbon atom of the $R^{21}$ group;

each occurrence of $R^{21}$ is independently selected from the group consisting of a monovalent hydrocarbon containing from 1 to about 25 carbon atoms, a monovalent hydrocarbon containing from 1 to about 25 carbon atoms and at least one heteroatom selected from the group consisting of oxygen atom, nitrogen atoms and sulfur atom, and a polyvalent hydrocarbon containing from 1 to about 25 carbon atoms in which at least one carbon atom is bonded to the oxygen of the oxygen-phosphorus group and at least one carbon atom is covalently bonded to a carbon atom of the $R^{20}$ group; and each occurrence of $R^{22}$ is independently a monovalent hydrocarbon containing 1 to about 25 carbon atoms and optionally containing at least one heteroatom selected from the group consisting of oxygen atom, nitrogen atoms and sulfur atom.

In particular, the phosphite processing stabilizer contains $R^{20}$, $R^{21}$ and $R^{22}$ groups that are monovalent alkyl groups, aryl groups or alkyl-substituted aromatic hydrocarbon groups.

Representative and non-limiting examples of phosphite stabilizers include tris(2,4-di-tert-butylphenyl)phosphite; 2-(2,4,8,10-tetratert-butylbenzo[d][1,3,2]benzodioxaphosphepin-6-yl)oxy-N,N-bis[2-(2,4,8,10-tetratert-butylbenzo[d][1,3,2]benzodioxaphosphepin-6-yl)oxyethyl]ethanamine; bis(2,4-di-tert-butyl-6-methylphenyl)-ethylphosphite; 3,9-bis-(2,4-di-tert-butyl-phenoxy)-2,4,8,10-tetraoxa-3,9-diphospha-spiro[5.5]undecane; and mixtures thereof.

In one embodiment, the stabilizers are selected from the group consisting of hindered phenols and phosphites available as Specialty Chemicals under the tradenames "Anox 20" and "Uvasil 299 HM/LM" (Great Lakes), "Doverphos 6" (Dover Chemical) and "Irganox 1010," "Irganox 1076," "Tinuvin 770," "Tinuvin 327," "Tinuvin 213" and "Tinuvin 622 LD" (Ciba), respectively.

In one particular embodiment, the stabilizer package is a blend of hindered phenol and phosphites. The weight ratio of the hindered phenol to phosphite is from 1 to 99 weight percent hindered phenol, more specifically from 2 to 50 weight percent hindered phenol, and even more specifically, from 3 to 15 weight percent hindered phenol, based on the total weight of the hindered phenol and phosphite. In one embodiment, the process includes quenching the silylated polymer composition by adding a scavenging package comprising a blend of 2-pyrrolidone and ε-caprolactam to the silylated polymer composition. In this embodiment, the silylating agent is isocyanatopropyltrimethoxysilane, the prepolymer has terminal hydroxyl or isocyanate groups and the step of adding the stabilization package containing a phosphite stabilizer further includes adding a hindered phenol.

In one embodiment, the instantly disclosed process comprises a silylation step. This silylation step comprises a silylation reaction where a first intermediate product is reacted with a silylation agent. The first intermediate product and the silylation agent are fed into the silylation unit where they mix and react to produce a second intermediate product. The first intermediate product is a prepolymer having reactive functional groups, such as a polyol, a chain extended prepolymer having reactive functional groups, a stabilized polyol, a stabilized chain extended prepolymer having reactive functional groups, or any combination thereof, as described herein. The second intermediate product is a silylated polymer composition or a partially silylated polymer composition. In one embodiment, the second intermediate product comprises a moisture-curable silylated polyurethane polymer. A partially silylated polymer composition contains unreacted reactive groups. These unreacted reactive groups may be from the first intermediate product or from the silylating agent or from other optionally included components. For example, where the silylation reaction does not proceed to completion, the second intermediate product will contain partially silylated prepolymers such that the prepolymers have unreacted reactive functional groups. The silylated or partially silylated polymer may be removed from the silylation unit or, if the process is a continuous process, be directed downstream through an outlet to downstream process chambers, including heat exchangers, mixers for adding other optional components, quenching units, and reservoir for storage or directed downstream for further processing. The silylated polymer may be removed from the silylated polymer composition, if desired, by known methods, as for example, exposure of silylated polymer composition to vacuum and/or heat to remove low boiling components, size exclusion chromatography, precipitation from solvents and passage through membranes or molecular sieves.

Various silylation agents are contemplated within the scope of this disclosure. Choice of silylation reaction will depend on the reactive functional groups that are present on the first intermediate product. For example, where the reactive functional groups of the first intermediate product include a hydroxyl, the silylating agent will have corresponding functional groups that are reactive with the hydroxyl group of the first intermediate product. In one example, the first intermediate product is a polyol having hydroxyl groups as the reactive functional group and the silylating agent contains an isocyanate (i.e., NCO) functional group. Where the first intermediate product includes isocyanate reactive functional groups, the silylating agent includes amino (i.e., —NH—), hydroxyl (i.e. —OH) or thiol (i.e., —SH) functional groups.

Specific silylating agents with isocyanate functional groups include isocyanatosilanes, for example. Specific silylating agents with amino functional groups include aminosilanes, for example. Other specific suitable silylating agents are also described elsewhere herein.

In one embodiment, suitable silylating agents have the general Formula (8):

$$YR^4Si(CH_3)_b(OR^5)_{3-b} \quad (8)$$

wherein:

Y is a functional group selected from the group consisting of —N=C=O, —SH, —OH and —NHR$^6$, where R$^6$ is selected from the group consisting of hydrogen, an alkyl group containing from 1 to about 10 carbon atoms, cycloalkyl group containing from about 5 to about 10 carbon atoms, an aralkyl group containing from about 7 to about 10 carbon atoms, phenyl and —CH[(C=O)OR$^7$]CHR$^8$C(=O)OR$^7$, where R$^7$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms and R$^8$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms;

R⁴ is a divalent alkylene group containing from 1 to about 10 carbon atoms, a cycloalkylene group containing from about 5 to about 10 carbon atoms and an arylene group containing from about 6 to about 10 carbon atoms;

each occurrence of $R^5$ is an alkyl group of from 1 to about 18 carbon atoms or a —$R^9(OR^{10})_cOR^{11}$, where $R^9$ is an alkyl group of from 1 to about 18 carbon atoms, $R^{10}$ is a divalent alkylene group of from about 2 to about 4 carbon atoms, and $R^{11}$ is an alkyl group of from 1 to about 10 carbon atoms or —$C(=O)R^{12}$, where $R^{12}$ is hydrogen, or an alkyl group of from 1 to about 6 carbon atoms; and the subscripts b and c are integers where b is 0 to about 2 and c is 0 to about 5.

In one embodiment, the X group on the prepolymer having reactive functional groups is —OH and the Y groups on the silylating agent is —N=C=O. In another embodiment, the X group on the prepolymer having reactive functional groups is —N=C=O and the Y groups on the silylating agent is —NHR⁶, where R⁶ is selected from the group consisting of hydrogen, an alkyl group containing from 1 to about 10 carbon atoms, cycloalkyl group containing from about 5 to about 10 carbon atoms, an aralkyl group containing from about 7 to about 10 carbon atoms, phenyl and —CH[(C=O)OR⁷]CHR⁸C(=O)OR⁷, where R⁷ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms and R⁸ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms.

In one embodiment, the silylation agent is defined by Formula (8), wherein Y is —N=C=O or —NHR⁶, where R⁶ is as defined above, R⁴ is methylene, ethylene or propylene, R⁵ is methyl or ethyl and b is 0 or 1, preferably 0.

Other suitable silylating agents include isocyanatosilanes, mercaptosilanes and aminosilanes. For example, the isocyanatosilane can be a selected from the group consisting of 3-isocyanatopropylmethyldimethoxysilane, 3-isocyanatopropyltrimethoxysilane and 3-isocyanatopropyltriethoxysilane. A suitable isocyanatosilane is available from Momentive Performance Materials, Inc. under the designation Silquest* A-Link 35. The aminosilanes can be, for example, selected from the group consisting of 4-amino-3,3-dimethylbutyltrimethoxysilane, 4-amino-3,3-dimethylbutyldimethoxymethylsilane, N-methyl-4-amino-3,3-dimethylbutyltrimethoxysilane, aminoisopropoxyethyltrimethoxysilane, aminoisopropoxypropyltrimethoxysilane, 4-amino-3,3-dimethylbutyltriethoxysilane, 4-amino-3,3-dimethylbutyldiethoxymethylsilane, N-methyl-4-amino-3,3-dimethylbutyltriethoxysilane, N-phenyl-3-aminopropyltrimethoxysilane and aminoisopropoxyethyltriethoxysilane.

Other suitable silylating agents include the mercaptosilanes 2-mercaptoethyl trimethoxysilane, 3-mercaptopropyl trimethoxysilane, 2-mercaptopropyl triethoxysilane, 3-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl triisopropoxysilane, 3-mercaptopropyl trioctoxysilane, 2-mercaptoethyl tri-2'-ethylhexoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl ethoxy dimethylsilane, 3-mercaptopropyl diethoxy methylsilane, 3-mercaptopropyl cyclohexoxy dimethyl silane, 4-mercaptobutyl trimethoxysilane, 3-mercapto-3-methylpropyltrimethoxysilane, 3-mercapto-3-methylpropyl-tripropoxysilane, 3-mercapto-3-ethylpropyl-dimethoxy methylsilane, 3-mercapto-2-methylpropyl trimethoxysilane, 3-mercapto-2-methylpropyl dimethoxyphenylsilane, 3-mercaptocyclohexyl-trimethoxysilane, 12-mercaptododecyl trimethoxy silane, 12-mercaptododecyl triethoxy silane, 18-mercaptooctadecyl trimethoxysilane, 18-mercaptooctadecyl methoxydimethylsilane, 2-mercapto-2-methylethyl-tripropoxysilane, 2-mercapto-2-methylethyl-trioctoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyl trimethoxysilane, 1-mercaptomethyltolyl triethoxysilane, 2-mercaptoethylphenyl trimethoxysilane, 2-mercaptoethyiphenyl triethoxysilane, 2-mercaptoethyltolyl trimethoxysilane, 2-mercaptoethyltolyl triethoxysilane, 3-mercaptopropylphenyl trimethoxysilane and, 3-mercaptopropylphenyl triethoxysilane, and the aminosilanes 3-aminopropyltrimethoxysilane, 3-aminopropyltriethoxysilane, 4-aminobutyltriethoxysilane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropylmethyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethylbutyldimethoxymethylsilane, N-ethyl-4-amino-3,3-dimethylbutyltrimethoxy-silane, N-(cyclohexyl)-3-aminopropyltrimethoxysilane, N-(2-aminoethyl)-3-aminopropyltrimethoxysilane, N-(2-aminoethyl)-3-aminopropyltriethoxy-silane, N-(2-aminoethyl)-3-aminopropylmethyldimethoxysilane, aminopropyltriethoxysilane, bis-(3-trimethoxysilyl-2-methylpropyl)amine and N-(3'-trimethoxysilylpropyl)-3-amino-2-methylpropyltrimethoxysilane.

In one embodiment, the silylating agent is used in an amount ranging from about 0.2 to about 1.5 molar equivalents based on the prepolymer containing reactive functional groups. The molar ratio of the silylation agent having Formula (5) to the prepolymer having reactive functional groups having Formula (1) is based upon the molar ratio of the Y function group on the silylating agent to the X functional groups on the prepolymer containing reactive functional groups, where the molar ratio (Y:X) is from about 0.2:1 to about 1.2:1, more specifically from about 0.8:1 to about 1.1:1, even more specifically from about 0.9:1 to about 1.05:1.

When X group of the prepolymer having reactive functional groups is a hydroxyl group, the molar amount of the hydroxyl content of the prepolymer having reactive functional groups is determined from the hydroxyl number. The hydroxyl number is determined in accordance with ASTM D4274-11, Standard Test Methods for Testing Polyurethane Raw Materials: Determination of Hydroxyl Numbers of Polyols. When the X of the prepolymer having reactive functional groups or Y group of the silylating agent is an isocyanate group, the molar amount of the isocyanate content of the prepolymer having reactive functional groups or the silylating agent is determined in accordance with ASTM D2572-97(2010), Standard Test Method for Isocyanate Groups in Urethane Materials or Prepolymers. When the X or Y group is an amino group, the molar amount of the amine content of the prepolymer having reactive functional groups or the silylating agent is determined in accordance with ASTM D2074-07(2013), Standard Test Methods for Total, Primary, Secondary, and Tertiary Amine Values of Fatty Amines by Alternative Indicator Method.

The reaction of the silylating agent can be carried out using less than or greater than a stoichiometric amount of the silylating agent. The reaction of the polyisocyanate with the polyols in the chain extension reaction can be incomplete prior to the addition of the silylating agent. In these cases, the reaction product may have residual X functional groups from the prepolymer having reactive functional groups or Y functional groups from the silylating agent. The excess X or Y functional groups can be quenched.

In one embodiment, the silylated polymer produced by the process is quenched silylated polymer, where the silylated polymer containing reactive function groups is quenched with a scavenging agent. The quenched silylated polymer is a third intermediate product. In one embodiment, the quenched silylated polymer produced by the process is a moisture-curable silylated polymer, more specifically a moisture-curable silylated polyurethane polymer.

The quenched silylated polymer has the general Formula (9):

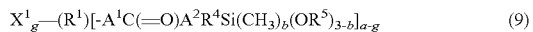

wherein:
each occurrence of $X^1$ is a functional group selected from the group consisting of

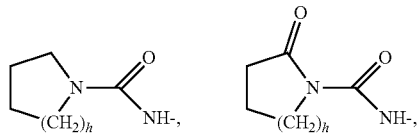

—NHC(=O)OR$^{15}$, —NHC(=O)NR$^{16}$R$^{17}$, N=C=O, CH$_2$=CH— and —OH, wherein each occurrence of R$^{15}$ is a monovalent hydrocarbon radical containing from about 1 to about 30 carbon atoms and optionally may contain a heteroatom, preferably an alkyl group of from 1 to about 6 carbon atoms or phenyl, each occurrence of R$^{16}$ is hydrogen, an alkyl group of from 1 to about 6 carbon atoms or phenyl, each occurrence of R$^{17}$ is hydrogen, an alkyl group of from 1 to about 6 carbon atoms or phenyl and the subscript h is an integer of from 1 to about 6, preferably 1 or 2;

each occurrence of A$^1$ is a functional group selected from the group consisting of —O—, —S— and —NH—;

each occurrence of A$^2$ is a functional group selected from the group consisting of —S—, —NR$^6$, where R$^6$ is selected from the group consisting of hydrogen, an alkyl group containing from 1 to about 10 carbon atoms, cycloalkyl group containing from about 5 to about 10 carbon atoms, an aralkyl group containing from about 7 to about 10 carbon atoms, phenyl and —CH[(C=O)OR$^7$]CHR$^8$C(=O)OR$^7$, where R$^7$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms and R$^8$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms;

R$^1$ is an organic group containing from about 50 to about 4,000 carbon atoms and at least one functional group selected from group consisting of —O—, —S—, —OC(=O)NH—, —R$^2$NC(=O)NH—, —C(=O)O—, —OC(=O)O—, —OCHR$^2$O—, —C(=O)NR$^2$— and —NR$^2$—, wherein each occurrence of R$^2$ is independently hydrogen, an alkyl group containing from 1 to about 6 carbon atoms or phenyl, preferably hydrogen;

R$^4$ is a divalent alkylene group containing from 1 to about 10 carbon atoms, a cycloalkylene group containing from about 5 to about 10 carbon atoms and an arylene group containing from about 6 to about 10 carbon atoms;

each occurrence of R$^5$ is an alkyl group of from 1 to about 18 carbon atoms or a —R$^9$(OR$^{10}$)$_c$OR$^{11}$, where R$^9$ is an alkyl group of from 1 to about 18 carbon atoms, R$^{10}$ is a divalent alkylene group of from about 2 to about 4 carbon atoms, and R$^{11}$ is an alkyl group of from 1 to about 10 carbon atoms or —C(=O)R$^{12}$, where R$^{12}$ is hydrogen, or an alkyl group of from 1 to about 6 carbon atoms, and the subscripts a, b, c and h are integers where a is 1 to about 5, b is 0 to about 2, c is 0 to about 5 and g is 0 or 1, with the provisos that (i) a-g is greater than or equal to 1, and (ii) when A$^1$ is —O— or —S—, then A$^2$ is —NH—.

In one embodiment, the instantly disclosed process comprises a quenching step. The quenching step comprises incorporating at least one scavenging agent into the process. In a batch process the at least one scavenging agent is preferably added directly to the silylation unit or to the silylated polymer composition after removal from the silylation unit. Alternatively, in a continuous process, it is contemplated that the at least one scavenging agent is added to various process chambers, including the silylation unit. However, it is preferred that the at least one scavenging agent is added downstream in a quenching unit. Quenching of the silylated polymer composition produces a quenched silylated polymer composition as a third intermediate product. In a continuous process the third intermediate product can be removed from the process chamber and the quenched silylated polymer recovered. Alternatively, the quenched silylated polymer composition is directed downstream towards a downstream process chamber as described herein.

A scavenging package can be used in place of a single scavenging agent to quench the silylated polymer. The scavenging package comprises at least one scavenging agent and at least one other ingredient, as for example, solvent, desiccant, catalysts and the like or two or more scavenging agents and optionally other ingredients. The scavenging package reacts with the silylated polymer composition, or at least a second portion thereof, to reduce an amount of unreacted reactive functional groups present in the silylated polymer composition. While various scavenging agents are contemplated for the instant process, surprisingly it has been found that scavenging agents that are cyclic amides, particularly C$_4$-C$_7$ amides, provide a more efficient process and provides silylated polymers having less viscosity creep. While not wishing to be bound by a single theory, it is believed that the high temperatures of the instant process reduce the usefulness of conventional scavenging agents. By contrast, suitable C$_4$-C$_7$ amides, having high flash points, are less susceptible to the high process temperatures and are therefore more suitable for quenching the unreacted reactive groups that remain in the second intermediate product. In a preferred embodiment, the C$_4$-C$_7$ amide is selected from 2-pyrrolidone and ε-caprolactam. In one embodiment, the scavenging package further comprises a vinyltrimethoxysilane in a blend with the at least one cyclic amide scavenging agent.

Suitable scavenging agents include isocyanate-reactive scavenging agents possessing at least one active hydrogen. Moreover, the isocyanate-reactive scavenging agent of the present invention is one that reacts with isocyanate at a rate greater than that of the undesired reaction that causes an increase in viscosity. The undesirable reactions include the further reaction of silylating agent containing isocyanate groups with the silylated polymer, as for example reaction of isocyanate with urethane to form allophanate, reaction of isocyanate with urea to form biuret, and reaction of the hydroxyl-terminated polymers with isocyanate-terminated polymers to form a new urethane group and increase the viscosity of the silylated polymer composition.

In one embodiment, a suitable scavenging package includes cyclic $C_4$-$C_7$ amides, such as 2-pyrrolidone, ε-caprolactam, or blends thereof. When the scavenging package includes ε-caprolactam as the scavenging agent, a solvent may be used to solubilize the scavenging agent. For example, the scavenging agent may be part of a scavenging package which includes a solvent and a ε-caprolactam. In another embodiment, the scavenging package is 2-pyrrolidone or 2-pyrrolidone in a solvent. In still another embodiment, the scavenging package includes a solvent, 2-pyrrolidone and ε-caprolactam. Suitable solvents include ethers, ketones, esters, or vinyltrimethoxysilane.

The isocyanate-reactive scavenging agent or scavenging package can be added to the silylated polymer composition of the silylation reaction, which may still contain the silylating agent, prepolymer containing reactive functional groups, partially silylated polymer, silylated polymer, and optionally other ingredients, such as catalysts and non-protic solvents, at a desired point near the end of the silylation reaction. It is understood that for di- or polyisocyanate-extended polyols the hydroxyl-terminated polymer may contain residual isocyanate, either from partially reacted di- or polyisocyanate, or from unreacted di- or polyisocyanate. The residual isocyanate present in the silylated polymer composition can come from the di- or polyisocyanate used to chain extend the polyol, or from the isocyanatosilane used to react with the prepolymer containing hydroxyl functional groups. The desired point for the addition of the isocyanate-reactive agent can be determined by the viscosity of the reaction mixture, or by some other method. Thus, the isocyanate-reactive scavenging agent is added to the reaction mixture at a particular viscosity depending on formulation and the desired properties of the final product.

In one embodiment, the isocyanate-reactive scavenging agent is added to the reaction mixture at a viscosity range from about 1,000 cP to about 150,000 cP, measured at a temperature of 25° C., and in another embodiment of the invention from about 30,000 cP to about 75,000 cP, measured at a temperature of 25° C. In this manner, the isocyanate-reactive scavenging agent minimizes batch-to-batch variation of the final viscosity of the silylated polymer composition.

The isocyanate-reactive scavenging agent is allowed to react with the isocyanate-containing reaction mixture for sufficient time to ensure that all or a substantial amount of the residual isocyanate has reacted. The isocyanate-reactive scavenging agent can be added in a stoichiometric amount relative to the residual isocyanate, but it is preferable to add an excess of the isocyanate-reactive scavenging agent to ensure that all of the residual isocyanate is reacted.

The isocyanate-reactive scavenging agent can be added neat, or as a mixture with other materials. The silylated polymer composition can then be monitored to determine whether the silylated polymer composition still contains particular unreacted reactive groups. For example, the disappearance of unreacted reactive groups can be determined directly by analytical techniques such as infra-red spectroscopy and titration, or indirectly by the measurement of constant viscosity of the silylated polymer composition. For example, silylation of the prepolymers having reactive functional groups where the reactive functional group is an isocyanate is considered complete when less than 0.05 weight percent NCO, more specifically less than 0.02 weight percent NCO and more specifically no residual —N═C═O can be detected by either technique. A preferred method for determining the residual —N═C═O is ASTM D2572-97 (2010), Standard Test Method for Isocyanate Groups in Urethane Materials or Prepolymers.

According to one embodiment of the invention, the isocyanate-reactive scavenging agent is a mono-alcohol or a mixture of different mono-alcohols. In another embodiment, the mono-alcohol is combined with a $C_4$-$C_7$ amide.

Mono-alcohols are used because they have low odor, do not contribute to the color of the silylated polymer and inhibit the reaction of residual hydroxyl-terminated polymer with the alkoxysilyl group. Other active hydrogen compounds, such as amines and organic acids, have strong odor, can form color and can catalyze the reaction of the residual hydroxyl-terminated polymer with alkoxysilyl group.

The mono-alkanol isocyanate-reactive scavenging agent possesses the general Formula (10):

$$R^{15}\text{—OH} \qquad (10)$$

in which $R^{15}$ is a monovalent hydrocarbon radical containing from about 1 to about 30 carbon atoms and optionally may contain a heteroatom. The heteroatom can, for example, be oxygen, which can form organofunctional groups, such as ethers, ester, and ketone groups. In another embodiment, the hydrocarbon radical is selected from the group consisting of linear, branched and cycloalkyl, and alkenyl, aryl, arenyl and aralkyl.

Representative non-limiting examples of $R^{15}$ include alkyl, such as methyl, ethyl, propyl, isopropyl, butyl, pentyl, dodecyl, cyclohexyl, cyclopentyl, and 3-methylhexyl; alkenyl, such as vinyl, allyl and methallyl; aryl, such as phenyl; arenyl, such as 4-methylphenyl, 2,4-dimethylphenyl and 2,4,6-trimethylphenyl; and aralkyl, such as benzyl and 2-phenylethyl.

In another embodiment of the invention, the mono-alcohols have the hydroxyl group attached to a primary carbon. A primary carbon is one in which at least two hydrogen atoms are attached to the carbon, —$CH_2OH$. The mono-alcohol scavenging agents of the present invention are more reactive with the isocyanate group because they are less sterically hindered.

According to one embodiment of the invention, useful mono-alcohols as isocyanate-reactive scavenging agents include methanol, ethanol, n-propanol, isopropanol, n-butanol, sec-butanol, tert-butanol, hexanol, cyclohexanol and the like, and mixtures thereof.

In a specific embodiment of the invention, when the terminal alkoxysilyl group of the silylated polymer is a methoxysilyl the specific isocyanate-reactive scavenging agent is methanol. In another specific embodiment of the invention, when the terminal alkoxysilyl group of the silylated polymer is an ethoxysilyl, the specific isocyanate-reactive scavenging agent is ethanol.

In one embodiment of the invention, mixture of the second intermediate product with the scavenging package results in a quenched silylated polymer composition with a reduced content of unreacted reactive functional groups. For example, in one specific embodiment the mixture of the silylated polymer composition with the scavenging agent or scavenging package reduces the amount of isocyanate groups. The amount of isocyanate groups can be determined by known methods such as by titration. Moreover, the reduction in isocyanate groups is also indicated by the composition having specifically a viscosity of about 1,000 cP to about 150,000 cP, more specifically from about 30,000 cP to about 75,000 cP and most specifically from about 35,000 cP to about 65,000 cP, all measured at 25° C. In one embodiment, the scavenging package comprises at least one of a $C_4$-$C_7$ amide or an isocyanate reactive monoalcohol.

In one specific embodiment, the quenched silylated polymer is a novel polymer having the general Formula (11):

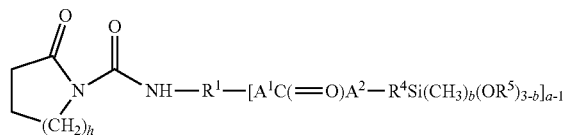

(11)

each occurrence of $A^1$ is a functional group selected from the group consisting of —O—, —S— and —NH—;

each occurrence of $A^2$ is a functional group selected from the group consisting of —S—, —$NR^6$, where $R^6$ is selected from the group consisting of hydrogen, an alkyl group containing from 1 to about 10 carbon atoms, cycloalkyl group containing from about 5 to about 10 carbon atoms, an aralkyl group containing from about 7 to about 10 carbon atoms, phenyl and —CH[(C=O)$OR^7$]$CHR^8$C(=O)$OR^7$, where $R^7$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms and $R^8$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms;

$R^1$ is an organic group containing from about 50 to about 4,000 carbon atoms and at least one functional group selected from group consisting of —O—, —S—, —OC(=O)NH—, —$R^2$NC(=O)NH—, —C(=O)O—, —OC(=O)O—, —OCH$R^2$O—, —C(=O)$NR^2$— and —$NR^2$—, wherein each occurrence of $R^2$ is independently hydrogen, an alkyl group containing from 1 to about 6 carbon atoms or phenyl, preferably hydrogen;

$R^4$ is a divalent alkylene group containing from 1 to about 10 carbon atoms, a cycloalkylene group containing from about 5 to about 10 carbon atoms and an arylene group containing from about 6 to about 10 carbon atoms;

each occurrence of $R^5$ is an alkyl group of from 1 to about 18 carbon atoms or a —$R^9$(O$R^{10}$)$_c$O$R^{11}$, where $R^9$ is an alkyl group of from 1 to about 18 carbon atoms, $R^{10}$ is a divalent alkylene group of from about 2 to about 4 carbon atoms, and $R^{11}$ is an alkyl group of from 1 to about 10 carbon atoms or —C(=O)$R^{12}$, where $R^{12}$ is hydrogen, or an alkyl group of from 1 to about 6 carbon atoms, and the subscripts a, b, c and h are integers where a is 2 to about 5, b is 0 to about 2, and c is 0 to about 5, with the proviso that when $A^1$ is —O— or —S—, then $A^2$ is —NH—.

In still another embodiment, the quenched silylated polymer of Formula (11), wherein $R^1$ is a derived from a poly(alkylene oxide)diol, more specifically, derived from a poly(propylene oxide) diol having a number average molecular weight of from 4,000 to 20,000 grams/mole, and even more specifically derived from an diisocyanate extended poly(propylene oxide) diol; $R^4$ is —CH$_2$—, —CH$_2$CH$_2$—, —CH$_2$CH$_2$CH$_2$— or —CH$_2$CH(CH$_3$)CH$_2$—, more specially —CH$_2$CH$_2$CH$_2$—; $R^5$ is —CH$_3$ or —CH$_2$CH$_3$; $A^1$ is —O— or —NH—; $A^2$ is —$NR^6$, where $R^6$ is selected from the group consisting of hydrogen, an alkyl group containing from 1 to about 5 carbon atoms, cycloalkyl group containing from about 5 to about 7 carbon atoms, an aralkyl group containing from about 7 to about 10 carbon atoms, phenyl and —CH[(C=O)$OR^7$]$CHR^8$C(=O)$OR^7$, where $R^7$ is an alkyl group of from 1 to about 5 carbon atoms and $R^8$ is an alkyl group of from 1 to about 10 carbon atoms, more specifically $A^2$ is —NH— or —NCH$_3$—; and a is an integer from 2 or 3, more specifically 2.

In one embodiment, the process comprises at least one upstream process chamber that is in connected (in continuous communication), directly or indirectly, with the silylation unit. The at least one upstream process chamber includes, for example, reactant reservoirs, reaction units, feed lines, premixers, heat exchangers and various combinations thereof.

In one embodiment, the process includes a chain extension unit as an upstream process chamber. This chain extension unit is used for the chain extension reaction. The chain extension unit is preferably a tubular reactor having at least one inlet and at least one outlet. The at least one inlet receives the polyol and the chain extension agent into the tube reactor where they are mixed and allowed to react to produce the chain extended prepolymer having reactive functional groups as the first intermediate product. The chain extended prepolymer, having reactive functional groups, is then continuously fed downstream through the chain extension tubular reaction unit and through outlet of the chain extension tubular reaction unit. In a preferred embodiment, the chain extension unit feeds the chain extended prepolymer having reactive functional groups into the silylation unit.

In one embodiment, the process includes a mixer as an upstream process chamber. The mixer is used to mix the prepolymer having reactive functional groups with a stabilization package or alternatively is used to mix the prepolymer having reactive functional groups with other components such as a catalyst. The mixer comprises at least one inlet and at least one outlet. Where the process includes an early incorporation of the stabilizer or stabilization package, the at least one inlet receives the polyol and the stabilizer or stabilization package into the mixer where they are mixed and provide a stabilized prepolymer having reactive functional groups. In one embodiment, the prepolymer having reactive functional groups is a polyol or a chain extended polyol. The stabilized prepolymer is continuously directed downstream by the at least one outlet toward the silylation unit and other downstream process chambers.

In one embodiment, the process comprises at least one downstream process chamber that is connected (in continuous communication), directly or indirectly, with the silylation unit. The at least one downstream process chamber includes, for example, reactant reservoirs, reaction units, feed lines, premixers, heat exchangers, storage units, cooling units and various combinations thereof.

In one embodiment, the process includes a quenching unit as a downstream process chamber. The quenching unit is used to quench unreacted reactive groups that remain in the second intermediate product. For example, where the silylation reaction does not proceed to completion, unreacted terminal reactive functional groups remaining in the second intermediate product can be quenched in this quenching step. The quenching unit is a tubular reaction unit comprising at least one inlet and at least one outlet. The second intermediate product is fed into the quenching unit through the at least one inlet where it is reacted with the scavenging agent or scavenging package to produce a quenched silylated polymer composition, as a third intermediate product. The silylated polymer can be removed from the quenching unit or directed by the at least one outlet towards a downstream process chamber, such as a storage chamber, an analysis chamber, or a cooling chamber.

In a particular embodiment, the process for preparing a silylated polymer composition comprises:

(a) adding at least one stabilizer or a stabilizer package and an optionally a catalyst to a first intermediate product to provide for stabilized prepolymer containing reactive functional groups mixture;

(b) directing the stabilized prepolymer containing reactive functional groups mixture of step (a) to a silylation unit;

(c) adding a silylating agent to the stabilized prepolymer containing reactive functional groups mixture of step (b) to the silylation unit of step (b) to provide for a silylation reaction mixture;

(d) reacting the prepolymer containing reactive functional groups (first intermediate product) with the silylating agent in the silylation reaction mixture of step (c) to provide for a second intermediate product optionally comprising a partially silylated polymer; and (e) removing the second intermediate product from step (d) to provide for the silylated polymer composition, wherein the silylated polymer composition is stabilized and has low color and color stability.

In another embodiment, the process for preparing the silylated polymer composition which has been stabilized and has low color and color stability is either a batch process or a continuous process. In still another embodiment, the process for preparing the silylated polymer composition which has been stabilized and has low color and color stability is a continuous process where each step (a) to (e) is conducted continuously. In yet another embodiment, the process for preparing the silylated polymer composition which has been stabilized and has low color and color stability is a continuous process where the silylation reaction occurs in an endcapping tubular reaction unit. In yet still another embodiment, the process further comprises at least one process chamber upstream of the silylating unit and/or at least one process chamber downstream of the silylating unit.

The invention will be further understood through the description of the figures which represent some specific embodiments of the continuous process of producing a silylated polymer composition without backmixing.

FIG. 1 depicts one embodiment of the continuous process for making a silylated polymer. The process comprises a silylating step without a backmixing and an upstream stabilization step. A prepolymer containing reactive functional groups is mixed with a stabilization package and a catalyst to provide a stabilized prepolymer. The silylating step comprises an endcapping reaction in a tubular reactor (30) referred to herein as the silylation unit (30). In the endcapping reaction a silylating agent and the stabilized prepolymer, which has reactive functional groups, are reacted in the silylation unit (30) to form a silylated polymer composition, as a second intermediate product. A feed line (62) delivers fresh stream of silylating agent from reservoir (60b) into the mixer (21). The second intermediate product is continuously directed downstream towards other process chambers. In this embodiment, the prepolymer is pumped from reservoir (10) by a pump (11) into a mixer (70) where it is mixed with a stabilization package and catalyst delivered by feed line (61) from reservoir (60a). The mixed stabilization package, catalyst and prepolymer are then directed into a heat exchanger (80) where the temperature of the mix is adjusted to a predetermined temperature and then directed into a second mixer (21) where it is mixed with silylating agent. The silylated polymer composition is then directed downstream of the silylation unit (30) into a heat exchanger (51) where the temperature is adjusted to a predetermined temperature and then directed downstream towards a storage container (90).

In another embodiment, as depicted in FIG. 2, the process comprises a silylation step and an upstream stabilization step. The silylation step includes a silylation reaction where the reaction occurs in a tubular reactor having a reactor chamber (30) coupled to a variable diameter reactor chamber (31). A silylating agent and a stabilized prepolymer having reactive functional groups are reacted in the silylation unit (30) to form a silylated polymer composition, as a second intermediate product. A feed line (62) delivers a fresh stream of silylating agent from reservoir (60b) into the mixer (21). The second intermediate product is continuously directed downstream towards other process chambers. In this embodiment, the prepolymer is pumped from reservoir (10) by a pump (11) into a mixer (70) where it is mixed with a stabilization package and catalyst delivered by feed line (61) from reservoir (60a). The mixed stabilization package, catalyst and prepolymer are then directed into a heat exchanger (80) where the temperature of the mix is adjusted to a predetermined temperature and then directed into a variable diameter tubular silylation unit (31) before being delivered to the silylation unit (30) to procures the silylated polymer composition. The silylated polymer composition is directed downstream of the silylation unit (30) into a heat exchanger (51) where the temperature is adjusted to a predetermined temperature and then directed downstream towards a storage container (90).

In another particular embodiment, the process for preparing a silylated polymer composition comprises:

(a) adding at least one stabilizer or a stabilizer package and optionally a catalyst to a first intermediate product to provide for stabilized prepolymer containing reactive functional groups mixture;

(b) directing the stabilized prepolymer containing reactive functional groups mixture of step (a) to a silylation unit;

(c) adding a silylating agent to the stabilized prepolymer containing reactive functional groups mixture of step (b) to the silylation unit of step (b) to provide for a silylating reaction mixture;

(d) reacting the prepolymer containing reactive functional groups (first intermediate product) with the silylating agent present in the silylating reaction mixture of step (c) to provide for a second intermediate product comprising a partially silylated polymer;

(d.1) directing at least a portion of the second intermediate product comprising a partially silylated polymer of step (d) to a quenching unit;

(d.2) adding a scavenging agent or scavenging package to the quenching unit containing the second intermediate product comprising a partially silylated polymer of step (d.1) to provide for a quenching mixture;

(d.3) reacting the at least one scavenging agent with the partially silylated polymer present in the quenching reaction mixture of step (d.2) in the quenching unit to produce a silylated polymer composition;

(e) removing the silylated polymer composition from the quenching unit of step (d.3) to provide silylated polymer composition, wherein the silylated polymer composition is stabilized and quenched and has low color and color stability.

In another embodiment, the process for preparing the silylated polymer composition comprises a silylation step, an upstream stabilization step, and a downstream quenching step. The silylated polymer composition produced by the process has low color and color stability is whether produced by a batch process or a continuous process. In one embodiment, the process for preparing the silylated polymer composition is a continuous process as described in steps (a) to (e). The process for preparing the silylated polymer composition which has been stabilized and quenched and has low color and color stability is a continuous process where the silylation reaction occurs in an endcapping tubular reaction unit and the quenching reaction occurs in a downstream quenching tubular reaction unit. In yet still another embodiment, the process further comprises at least one process chamber upstream of the silylating unit and/or at least one other process chamber downstream of the quenching unit.

FIG. 3 depicts one embodiment of the continuous process for making a silylated polymer. The process comprises a silylating step without a backmixing, an upstream stabilization step, and a downstream quenching step. In the stabilization step a prepolymer containing reactive functional groups is mixed with a stabilization package and a catalyst to provide a stabilized prepolymer. The silylating step comprises an endcapping reaction in a tubular reactor (30) referred to herein as the silylation unit (30). The silylating agent and the stabilized prepolymer having reactive functional groups are reacted in the silylation unit (30) to form a silylated polymer composition, as a second intermediate product. A feed line (62) delivers a fresh stream of silylating agent from reservoir (60b) into the mixer (21). The second intermediate product is continuously directed downstream towards other process chambers. In this embodiment, the prepolymer is pumped from reservoir (10) by a pump (11) into a mixer (70) where it is mixed with a stabilization package and catalyst delivered by feed line (61) from reservoir (60a). The mixed stabilization package, catalyst and prepolymer are then directed into a heat exchanger (80) where the temperature of the mix is adjusted to a predetermined temperature and then directed into a second mixer (21) where it is mixed with silylation agent before being delivered to the silylation unit (30) to produce the silylated polymer composition. The silylated polymer composition is then directed downstream of the silylation unit (30) into a mixer or feed line in which the scavenging package is transported from the reservoir (60c) though a feed line to a mixer. The mixer mixes the scavenging agent with second intermediate product containing partially silylated polymer, and then transports the mixture of a quenching unit (40), where the scavenging agents react with the partially silylated polymer to generate a third intermediate product, which is optionally cooled and then directed downstream towards a storage container (90).

In still another particular embodiment, the process for preparing a silylated polymer composition comprises:

a) continuously mixing a poly(propylene oxide) diol having a molecular weight of from about 4,000 grams/mole to about 20,000 grams/mole containing from about 0.001 with about 5 weight percent, more specifically about 0.1 to about 2 weight percent, and even more specifically about 0.5 to about 1 weight percent of a sterically hindered phenol and from about 0.001 to about 5, more specifically about 0.1 to about 2 weight percent, and even more specifically about 0.5 to about 1 weight percent of a phosphite stabilizer, wherein the weight percents are based on the weight of the polyol, to form a stabilized polyol mixture;

b) continuously adding the stabilized polyol mixture and a diisocyanate chain extension agent to a chain extension unit to form a chain extension reaction mixture, wherein the diisocyanate chain extension agent is selected from the group consisting of isophorone diisocyanate, dicyclohexylmethane-4,4'diisocyanate, hexamethylene diisocyanate, cyclohexane diisocyanate, or 1,3-bis-(isocyanatomethyl)cyclohexane or mixtures thereof;

c) continuously reacting the diisocyanate chain extension agent with the poly(propylene oxide) diol present in the chain extension reaction mixture of step b) at a temperature of from about 85° C. to about 180° C. to form a chain extended prepolymer comprising terminal reactive functional groups;

d) continuously adding the chain extended prepolymer and an aminosilane or an isocyanatosilane to a silylation unit to provide form a silylating reaction mixture;

e) continuously reacting the chain extended prepolymer with the aminosilane or the isocyanatosilane at a temperature of from about 85° C. to about 180° C. to form a silylated polymer composition containing a silylated polymer;

f) continuously removing the silylated polymer from the silylated polymer composition.

Optionally, the process further comprises steps (ε-1) and (ε-2). In step (ε-1) the silylated polymer composition of step e) and a scavenging agent or scavenging package are continuously directed into a quenching unit to form a quenching mixture; and in step (ε-2) the scavenging agent or scavenging package are continuously reacted with the silylated polymer composition to reduce an amount of unreacted reactive functional groups in the silylated polymer composition.

The silylated polymer produced from this process is stabilized, quenched and has low color and color stability.

In another embodiment, the process for preparing the silylated polymer composition which has been stabilized and has low color and color stability is either a batch process or a continuous process. In still another embodiment, the process for preparing the silylated polymer composition is a continuous process as described in steps (a) to (f). The process for preparing the silylated polymer composition which has been stabilized and has low color and color stability is a continuous process where the silylation reaction occurs in an endcapping tubular reaction unit. In yet still another embodiment, the process further comprises at least one process chamber upstream of the chain extension reaction unit and/or at least one other process chamber downstream of the silylation unit.

In one embodiment, as depicted in FIG. 4, the process comprises a silylation step and a stabilization step upstream of the silylation step. The process also includes an upstream chain extension step comprising a chain extension reaction where a polyol is reacted with a chain extension agent to provide a chain extended polymer having terminal reactive functional groups. In the stabilization step, a first feed line (61) delivers a stream of a catalyst, from reservoir (60a), and a stabilization agent, from reservoir (60a), into a first mixer (70) where they are mixed with the polyol. This mixture is directed into a downstream heat exchanger (80), which adjusts the temperature of the mixture and directs the polyol downstream into a premixer (21) before delivering it to a tubular chain extension reactor unit (20). A chain extension agent, polyisocyanate, is also directed into this chain extension unit (20) where it reacts with the polyol to produce a chain extended polymer. The chain extended polymer is then directed downstream toward a silylation unit (30) where it undergoes the silylation reaction to produce the silylated polymer composition. The silylated polymer composition is then directed downstream towards cooling unit (51) or storage unit (90). This polymer comprises terminal reactive functional groups. The stabilization step results in a finally produced silylated polymer with reduced discoloration and intermediate products along the process with reduced discoloration. The discoloration is also reduced as the silylated polymer ages over time.

In still yet another particular embodiment, the process for preparing a silylated polymer composition comprises:

(a) adding at least one stabilizer or a stabilizer package and optionally a catalyst to a polyol to form a stabilized polyol mixture;

(b) directing the stabilized polyol mixture of step (a) to a chain extension unit;

(c) adding a chain extension agent to the chain extension unit of step (b) to form a chain extension reaction mixture;

(d) reacting the chain extension agent with the polyol present in the chain extension reaction mixture of step (c) to form a first intermediate product mixture comprising a stabilized prepolymer having reactive functional groups;

(e) directing the first intermediate product mixture of step (d) to a silylation unit;

(f) adding a silylating agent into the silylation unit of step (e) with the first intermediate product and allowing them to mix to provide for a silylating reaction mixture;

(g) reacting the prepolymer containing reactive functional groups with the silylating agent present in the silylating reaction mixture of step (g) to provide for a second intermediate product comprising a partially silylated polymer;

(h) directing at least a portion of the second intermediate product of step (g) to a quenching unit;

(i) adding a scavenging agent or scavenging package to the quenching unit containing the second intermediate product in step (h) to provide for a quenching mixture;

(j) reacting the at least one scavenging agent or scavenging package with the silylated polymer composition present in the quenching reaction mixture of step (i) in the quenching unit to produce a quenched silylated polymer composition with a reduced amount of unreacted reactive functional groups;

(k) removing the silylated polymer composition from the quenching unit of step (j) to provide a silylated polymer, wherein the silylated polymer is stabilized and quenched and has low color and color stability.

In another embodiment, the process for preparing the silylated polymer composition comprises a silylation step, an upstream stabilization step and a downstream quenching step. The process can be either a batch or continuous process and produces a silylated polymer with low color and with color stability. The process for preparing the silylated polymer composition which has been stabilized and quenched and has low color and color stability is a continuous process as described in steps (a) to (k). In yet another embodiment, the process for preparing the silylated polymer composition which has been stabilized and quenched and has low color and color stability is a continuous process wherein the silylation unit is an endcapping tubular reaction unit and the quenching unit is quenching tubular reaction unit. In still yet another embodiment, the process further comprises at least one process chamber upstream of the chain extension unit and/or at least one other downstream chamber to the quenching reaction unit.

In one embodiment, as depicted in FIG. 5, the process comprises a silylation step, an upstream chain extension step, and an upstream stabilization step where the stabilization step is upstream of the chain extension step and the silylation step. The chain extension step comprising a chain extension reaction where a polyol is reacted with a chain extension agent to provide a chain extended polymer having terminal reactive functional groups. In the stabilization step, a first feed line (61) delivers a stream of a catalyst, from reservoir (60a), and a stabilization agent, from reservoir (60a), into a first mixer (70) where they are mixed with the polyol. This mixture is directed into a downstream heat exchanger (80), which adjusts the temperature of the mixture and directs the polyol downstream into a tubular chain extension reactor unit (20). A chain extension agent, polyisocyanate, is also directed into this chain extension unit (20) where it reacts with the polyol to produce a chain extended polymer. This polymer comprises terminal reactive functional groups. The stabilized and chain extended polymer composition, the first intermediate product, is then directed downstream towards the silylation unit (30). A silylation reaction in the silylation unit (30) produces the silylated polymer composition.

The silylation step is followed by a downstream quenching step. The silylated polymer composition is directed downstream from the silylation unit (30) towards a tubular quenching unit, where the silylated polymer composition is quenched in a quenching step. In the quenching step a scavenging package, which includes at least one scavenging agent, is directed into the quenching unit from a reservoir (60c). The scavenging package is mixed with the silylated polymer composition and allowed to react until the amount of unreacted reactive functional groups in the composition reach a predetermined level. After quenching, the silylated polymer composition is directed downstream towards a cooling unit (51) and then to the outlet of the unit (90). The silylated polymer is obtained from the silylated polymer composition by known isolation methods. The stabilization step results in a finally produced silylated polymer with reduced discoloration and intermediate products along the process with reduced discoloration. The discoloration is also reduced as the silylated polymer ages over time. The quenching step reacts unreacted functional groups with the scavenging agent.

In one embodiment, the process comprises an endcapping unit. Optional upstream process chambers include, for example, a mixing chamber upstream of a heat exchanger unit, which is upstream of a premixer of a chain extension unit, which is upstream of a chain extension unit, which is upstream of a premixer of the endcapping unit, which is upstream of the endcapping unit. Optional downstream process chambers include, for example, a premixer of a quenching unit, which is upstream of the quenching unit, which is upstream of at least one cooling unit, which is upstream of at least one analysis unit, which is upstream of a storage unit. When present, these reactions chambers are in fluid contact (communication) with each other and with the reactant reservoirs via the feed lines. A product from one upstream reaction chamber is communicated downstream towards another process chamber. Feed lines deliver feed streams of reactants into the various process chambers at inlets of the process chambers or at some intermediate location between the inlet of the process chamber and the outlet of the process chamber. The reactants in a reaction unit are heated, mixed, provided time for reaction, or any combination thereof such that a reaction product is produced and directed to an outlet of the reaction unit.

Although the process chambers and reactant reservoirs are described as optional in the above paragraph, in preferred embodiments at least one of the optional process chambers is present and at least one of the reactant reservoirs is present. In another embodiment, at least one reaction chamber is upstream of the endcapping unit and at least one reaction chamber is present downstream of the endcapping unit.

In the various reactions taking place in the various reaction chambers, the reactants are mixed, heated, reacted or any combination thereof. For example, the first intermediate product and the silylating agent are mixed, heated and reacted in the endcapping unit to provide the second intermediate product.

References made herein to reaction units encompass reactors known to those of ordinary skill in the art. Reaction units that are used in the process depend on the conditions under which the reaction unit will operate; such as the type of flow rate, the temperature, the reaction rate, the reactants, or the pressure. In one embodiment, the reaction unit is a tubular reactor with an internal static mixer. The reactor's ratio of length to diameter (L/D) can typically range from about 10:1 to about 50:1 although ratios outside of this range can be employed where appropriate. In an embodiment, the reaction is typically conducted at a temperature of up to about 200° C. In another embodiment, the reaction temperature can range from about 80° C. to about 170° C. In yet another embodiment, the reaction temperature can range from about 120° C. to about 150° C. The reactants are linearly moved through the reaction chambers. The residence time of reactants in the tubular reactor can typically be up to about 120 minutes, although any suitable residence time can be selected.

As a continuous process more than one process chamber is used, though they may all be tubular reactors, the dimensions may be different. However, in preferred embodiments, the reaction units are tubular reaction units. In some embodiments a singular tubular reactor may have a varying diameter such that the flow rate and residence time and therefore the reaction kinetics can be manipulated as desired. For example, in one specific embodiment, the endcapping unit is a tubular reactor with a variable diameter section that is varied to diameters corresponding to a desired flow rate or residence time in the unit or to a desired property of the final silylated polymer.

While it is contemplated within the scope of this disclosure that the process is a continuous process and that the reaction units upstream and downstream of the endcapping unit may be optional, it is preferred that the extension unit is present upstream of the endcapping tubular reaction unit and is connected directly or by means of a line with the endcapping tubular reaction unit such that there is fluid communication between the two units. The chain extended polyol formed in the extension unit by the chain extension reaction is delivered by continuous process to the endcapping tubular reaction unit as the first intermediate product.

While suitable chain extension units for carrying out the chain extension reaction will be readily apparent to those of ordinary skill in the art, it is contemplated herein that the extension unit is, for example, a tubular reactor with an upstream inlet and a downstream outlet as described herein. In one embodiment, the polyol is delivered or fed into the extension unit by a delivery means such as by hand or by automation or by an outlet of an upstream process chamber. The chain extension agent is likewise delivered or fed to the extension unit by a delivery means such as by hand or by automation or by an outlet of an upstream process chamber or from an upstream reservoir. The polyol and chain extension agent may be fed into the extension unit simultaneously or alternatively, though it is preferred that the reactant with the higher mass will be fed in first. The polyol and the chain extension agent are allowed to mix and react in the extension unit to produce the prepolymer having reactive functional groups, specifically the chain extended polyol, as a first intermediate product.

In embodiments where the prepolymer having reactive functional groups is a polyol, the extension unit is optional since extension of the polyol is not required.

Additional components are also contemplated for addition to the continuous process for preparing silylated polymer with backmixing. Suitable additional components are described herein. For example, the additional component includes at least one of catalysts, plasticizers, colorants, stabilizers, antioxidants, thixotropes, fillers and the like. The additional components may be added during the continuous process or at the end before or after incorporation into adhesives, coatings and the like. For example, in one embodiment stabilizers, catalysts or blends thereof are included in the continuous process.

Where the process includes additional components, the additional components may be added in different steps along the continuous process. For example, in one embodiment one stabilizer is added in the mixer, while another is added in a premixer of the chain extension unit. Catalysts, plasticizers, colorants, stabilizers, antioxidants, thixotropes, fillers and the like may also be individually added or blended into the same or separate stage of the process. It is also contemplated herein that the additional components, such as multiple stabilizers, are blended and added into the various reaction units, upstream or downstream of the silylating reaction unit, or in the silylation unit.

In one embodiment, the process for preparing a silylated polymer includes incorporating additional components such as catalysts, plasticizers, colorants, stabilizers, thixotropes, fillers and the like. Exemplary plasticizers include phthalates, dipropylene and diethylene glycol dibenzoates and mixtures thereof, epoxidized soybean oil and the like. Useful sources of dioctyl and diisodecyl phthalate include those available under the tradenames "Jayflex DOP" and "Jayflex DIDP" from Exxon Chemical. The dibenzoates are available as "Benzoflex 9-88", "Benzoflex 50" and "Benzoflex 400" from Velsicol Chemical Corporation. The plasticizer typically comprises up to 100 parts per hundred parts of the moisture-curable silylated polymer with 40 to 80 parts per hundred being preferred.

Exemplary fillers include reinforcing fillers such as fumed silica, precipitated silica, clay, alumina, aluminosilicates and calcium carbonates. To further improve the physical strength of the formulations, reinforcing carbon black can be used as a main filler, leading to black systems. Several commercial grades of carbon black useful in this invention are available, such as "Corax" products (Degussa). To obtain translucent formulations, higher levels of fumed silica or precipitated silica should be used as the main filler, without carbon black.

Treated calcium carbonates having particle sizes from 0.07 microns to 4 microns are preferred fillers and are available under several trade names, such as: "Ultra Pflex" and "Hi Pflex" from Specialty Minerals; "Winnofil SPM" and "Winnofil SPT" from Zeneca Resins; "Hubercarb 1 Qt", "Hubercarb 3 Qt" and "Hubercarb W" from Huber and "Kotomite" from ECC. These fillers can be used either alone or in combination. The fillers generally comprise up to 300 parts per 100 parts of the silylated polymer with 80 to 150 parts being the more preferred loading level.

Catalysts are generally added to increase reaction rates between the polyol and the chain extension agent to produce the first intermediate product. For example, in one embodiment the catalyst is added to increase the reaction between the polyol and the a polyisocyanate to produce a first intermediate product of polyurethane prepolymer having terminal reactive groups that are either hydroxyl or isocyanate. Some suitable catalysts are dialkyltin dicarboxylates, such as dibutyltin dilaurate and dibutyltin acetate, tertiary amines, the stannous salts of carboxylic acids, such as stannous octoate and stannous acetate, and the like.

Catalysts typically used in the preparation of the first intermediate product can also be used to catalyze the reaction of the first intermediate product with a silylating agent. Suitable catalysts include metal and non-metal catalysts. Examples of the metal portion of the metal condensation catalysts useful in the present invention include tin, titanium, zirconium, lead, iron cobalt, antimony, manganese, bismuth and zinc compounds. Other suitable non-limiting examples of catalysts used for making the first or second intermediate product are well known in the art and include chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone-alkylenediimines, salicylaldehydeimine, and the like, with the various metals such as Al, Be, Mg, Zn, Cd, Pb, Ti, Zr, Sn, As, Bi, Cr, Mo, Mn, Fe, Co, Ni, and metal oxide ions as $MoO_2$++, $UO_2$++, and the like; alcoholates and phenolates of various metals such as $Ti(OR)_4$, $Sn(OR)_4$, $Sn(OR)_2$, $Al(OR)_3$, $Bi(OR)_3$ and the like, wherein R is alkyl or aryl of from 1 to about 18 carbon atoms, and reaction products of alcoholates of various metals with carboxylic acids, beta-diketones, and 2-(N,N-dialkylamino)alkanols, such as well known chelates of titanium obtained by this or equivalent procedures. Further catalysts include organometallic derivatives of tetravalent tin, trivalent and pentavalent As, Sb, and Bi, and metal carbonyls of iron and cobalt; and combinations thereof. In one specific embodiment organotin compounds that are dialkyltin salts of carboxylic acids, can include the non-limiting examples of dibutyltin diacetate, dibutyltin dilaurate, dibutyltin maleate, dilauryltin diacetate, dioctyltin diacetate, dibutyltin-bis(4-methylaminobenzoate), dibutyltindilaurylmercaptide, dibutyltin-bis(6-methylaminocaproate), and the like, and combinations thereof. Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like, and combinations thereof. For example, in one embodiment, a first intermediate product of polyurethane prepolymer having terminal reactive groups that are hydroxyl is reacted with an isocyanatosilane in the presence of a catalyst such as Sn metal catalyst to form the second intermediate product, which is of a silylated polyurethane composition.

In one embodiment, the amount of catalyst is from 0.01 to 5 weight percent, more specifically from 0.1 to 2 weight percent and even more specifically, from 0.15 to 1 weight percent, based on the weight of the prepolymer containing reactive functional groups.

Additional stabilizing agents and antioxidants are also contemplated as additional components, which may be added to the process. UV stabilizers and/or antioxidants can be incorporated into the sealant or adhesive formulations of this invention in an amount from 0.0001 to 5 parts per hundred parts of moisture-curable silylated polymer with 0.5 to 2 parts being preferred. Although the stabilizing agents can be incorporated into the sealants or adhesives, it is also contemplated that the stabilizing agents are added to at least one of the steps of the production process of the moisture-curable silylated polymer.

The invention will be further understood through the description of the figures which represent some specific embodiments of the process of producing a silylated polymer. The process, in one embodiment, consists essentially of a silylation step without backmixing for producing a silylated polymer composition; and at least one of a stabilization step and a quenching step.

The following non-limiting examples further describe and disclose the invention.

EXAMPLES

Example 1

Batch Process for Preparing Moisture-Curable Silylated Polyurethane Polymer Using ε-Caprolactam Scavenging Agent To a four neck resin kettle 400 gram of the polyol pre-dried polypropylene oxide diol (HMBT-80 supplied by Zhejiang Huangma Chemical) was charged together with phenolic stabilizer (2 grams of Irganox 1135 supplied by BASF). The kettle was heated to 80° C. with agitation and blanketed with $N_2$. To the kettle Sn metal catalyst was added (10 ppm of Sn was calculated from Fomrez SUL-4 supplied by Momentive Performance Materials, Inc). After mixing for 10 min, chain extension agent, isophorone diisocyanate, (5.18 grams of the IPDI supplied by Bayer) was added in the kettle. The reaction was kept at 83° C. until the NCO, monitored by titration, was not detected (reached near 0%) and then 3-isocyanatopropyltrimethoxysilane (11.64 grams of Silquest A-Link 35 obtained from Momentive Performance Materials, Inc.) was added in the kettle. The reaction mixture was maintained at 80° C. until the NCO content was ~0.04% (determined by titration). Then the scavenging package was added in the kettle.

The scavenging package was a pre-melted quench solution made of ε-caprolactam (0.5 grams obtained from SigmaAldrich) and vinyltrimethoxysilane (3.3 gram obtained as Silquest A-171 silane from Momentive Performance Materials, Inc). The mixture was melted on a heat/magnetic stir plate.

The temperature was maintained at 80° C. for additional 30 min and then the kettle was cooled down and the polymer was discharged. The final product contains no detectable NCO content as measured by FTIR. The cured product has 95 psi of tensile strength at break, 164% of elongation, 70 psi of modulus at 100% extension, and 22 Shore A hardness.

ε-Caprolactam is a solid at room temperature and is not easily incorporated into the continuous unit. The pre-melted quench solution of 0.5 grams of ε-caprolactam and 3.3 gram of vinyltrimethoxysilane precipitated the ε-caprolactam on standing at room temperature. To overcome crystallization of the ε-caprolactam, a series of scavenging packages were made consisting of mixtures of ε-caprolactam, 2-pyrrolidone, and vinyltrimethoxysilane. These series of scavenging packages were evaluated for stability at 23° C. for 1 day and at 0° C. for 5 hours. The 2-pyrrolidone can interrupt the crystallinity of ε-caprolactam and provide for a liquid scavenging package. The stability of these scavenger packages is presented in Table 1. The scavenger packages using a mixture of ε-caprolactam and 2-pyrrolidone was an approach that offered a good balance of kinetics of quenching (the reaction of NCO groups with 2-pyrrolidone is slower than with ε-caprolactam) and miscibility.

TABLE 1

Evaluate the stability of quenching solution at different ratio of ε-caprolactam and 2-pyrrolidone

| | Vinyltri methoxy- silane, grams | ε- Capro- lactam, grams | 2- Pyrro- lidone, grams | Ratio of ε-capro- lactam:2- Pyrro- lidone | PPT at 23° C. in 1 day | PPT at 0° C. in 5 hours |
|---|---|---|---|---|---|---|
| Scavenger Package 1 | 16.4 | 3.6 | 0 | | yes, PPT in 2 hours | yes |
| Scavenger Package 2 | 16.4 | 3.6 | 1 | 3.60 | no | no |
| Scavenger Package 3 | 16.4 | 3.6 | 0.8 | 4.50 | no | no |
| Scavenger Package 4 | 16.4 | 3.6 | 0.4 | 9.00 | no | no |
| Scavenger Package 5 | 16.4 | 3.6 | 0.3 | 12.00 | no | yes |

*2-Pyrrolidone was obtained from SigmaAldrich.
**PPT—precipitation

Example 2

Preparation of Moisture-Curable Silylated Polyurethane Polymer Using a Batch Process, Phenolic Stabilizer, and ε-Caprolactam and 2-Pyrrolidone Scavenging Agents Into a four neck resin kettle pre-dried polypropylene oxide diol (400 gram of HMBT-120 supplied by Zhejiang Huangma Chemical) was charged together with the phenolic stabilizer (2 grams of Irganox 1135 supplied by BASF). The kettle was heated to 80° C. with agitation and blanketed with $N_2$. To the kettle Sn metal catalyst was added (10 ppm of the Sn was calculated from Fomrez SUL-4 supplied by Momentive Performance Materials, Inc.). After mixing for 10 min, chain extension agent (4.08 grams of the IPDI) was added in the kettle. The reaction was kept at 83° C. until the NCO monitored by titration reached ~0%, then 11.64 gram of the 3-isocyanatopropyltrimethoxysilane (11.64 grams obtained as Silquest A-Link 35 from Momentive Performance Materials, Inc.) was added in the kettle and the reaction was continued at 80° C. until the NCO content was ~0.04% (by titration). Then the pre-melted quench solution was added in the kettle. The temperature was maintained at 80° C. for additional 30 min, then the kettle was cooled down and polymer was discharged. Next day the viscosity was measured as 56,000 cP at 25° C., and remaining NCO was zero as determined by FTIR.

The scavenging package used in this experiment was a mixture of vinyltrimethoxysilane (7.2 grams obtained as Silquest A-171 silane, 1.84 grams of ε-caprolactam, and 0.56 grams 2-pyrrolidone). The ε-caprolactam was melted in an oven at 80° C. before it was mixed with the vinyltrimethoxysilane and 2-pyrrolidone. The mechanical properties are presented in Table 2.

Example 3

Batch Preparation of Moisture-Curable Silylated Polyurethane Polymer with Phenolic Stabilizer and ε-Caprolactam and Methanol Scavenging Agents Into a four neck resin kettle pre-dried HMBT-120 (400 gram of Zhejiang Huangma Chemical) were charged together with phenolic stabilizer (2 grams of Irganox 1135). The kettle was heated to 80° C. with agitation and blanketed with $N_2$. Into the kettle Sn metal catalyst was added (10 ppm of Sn was calculated from Fomrez SUL-4 supplied by Momentive Performance Materials, Inc.). After mixing for 10 min, the chain extension agent (4.08 grams of IPDI) was added in the kettle. The reaction was kept at 83° C. until the NCO monitored by titration was reached near 0%, then 3-isocyanatopropyltrimethoxysilane (11.64 grams of Silquest A-Link 35) was added and the reaction was continued at 80° C. until the NCO content was ~0.04% (by titration). The scavenging package (7.2 grams of Silquest A-171 silane and 2 grams of methanol) was added. The reaction mixture was cooled to room temperature and discharged. Next day the viscosity was measured as 66,000 cP at 25° C., and the residual % NCO was zero, as determined by FTIR. The mechanical properties are presented in Table 2.

TABLE 2

Mechanical Properties of the Silylated Polyurethanes with Different Quench Solution

| One day cure Properties | Example 2 | Example 3 |
|---|---|---|
| Tensile Strength @ BK (psi) | 73 | 88 |
| Elongation at BK (%) | 317 | 249 |
| Modulus @ 100% E (psi) | 34 | 50 |
| Hardness Shore A | 12 | 16 |

Example 4

Batch Preparation of Moisture-Curable Silylated Polyurethane Polymer with Phenolic and Phosphite Stabilizer and Methanol Scavenging Agent Into a four-neck 500 mL round bottom flask equipped with an overhead mechanical agitator, nitrogen line, stopper and thermocouple were charged polyol poly(propylene oxide) diol (309.6 g of the HMBT-120, Zhejiang Huangma Chemical), hindered phenolic stabilizer (1.58 g of the Irganox 1135 obtained from BASF) and phosphite stabilizer, triisodecyl phosphite (1.59 g of Doverphos 6 obtained from Dover Chemical). The mixture was dried by sparging with nitrogen while heating at 80° C. with a heating mantle for ~180 minutes. (The water content could not be determined because the phosphite interferes with the Karl-Fischer titration water measurement.) The mixture was cooled to 72° C. under a nitrogen blanket. A solution of dibutyltin dilaurate (225 μL of 10 weight percent of Fomrez SUL-4 (obtained from Momentive Performance Materials, Inc.) in toluene) was charged and mixed for 25 minutes. The chain extension agent, isophorone diisocyanate (3.18 g of the Desmodur I, Bayer) was charged and heated for 57 minutes until the viscosity of the mixture was 31500 cP at 25° C. and then the silylating agent, 3-isocyanatopropyltrimethoxysilane (6.39 g of Silquest* A-Link 35 obtained from Momentive Performance Materials, Inc.) was added. After a further 230 minutes, the mixture had viscosity of 61100 cP at which point the scavenger package (6.42 grams of a mixture of vinyltrimethoxysilane, Silquest* A-171 silane obtained from Momentive Performance Materials, Inc. and methanol (5.7 weight percent methanol)) was charged. The reaction mixture was then allowed to cool slowly. The final product viscosity was 52800 cP at 25° C. and the product had color of 14 Pt—Co. A sample of the product was heated for 4 days at 80° C. and after heating, the polymer had color 22 Pt—Co.

Example 5

Batch Process for Preparation of Moisture-Curable Silylated Polyurethane Polymer Using a Phenolic and Phosphite Stabilizers and ε-Caprolactam and 2-Pyrrolidone Scavenging Agents Into a four-neck 500 mL round bottom flask equipped with an overhead mechanical agitator, nitrogen line, stopper and thermocouple were charged polyol poly(propylene oxide) diol (350.2 grams of the HMBT-120 obtained from Zhejiang Huangma Chemical), hindered phenolic stabilizer (1.83 grams of Irganox 1135 obtained from BASF) and phosphite stabilizer triisodecyl phosphite (1.95 grams of the Doverphos 6 obtained from Dover Chemical). The mixture was dried by sparging with nitrogen while heating at 80° C. with a heating mantle for ~150 minutes. (The water content could not be determined because the phosphite interferes with the Karl-Fischer titration water measurement.) The color of the mixture was 10 Pt—Co. The mixture was heated to 150° C. under a nitrogen blanket. A solution of catalyst (215 μL of a10 weight percent dibutyltin dilaurate, Fomrez SUL-4, Momentive Performance Materials, in toluene) was charged at 130° C. and mixed for 15 minutes. While the mixture was being heated to 150° C., the chain extension agent, isophorone diisocyanate (3.09 g of Desmodur I obtained from Bayer) was charged and reacted for 99 minutes until the viscosity of the mixture was 77200 cP at 25° C. The reaction the mixture was cooled to 80° C. which took 94 minutes. The reaction mixture had viscosity 85500 cP and color 16 Pt—Co. The silylating agent, 3-isocyanatopropyltrimethoxysilane (6.80 g of the Silquest* A-Link 35 silane obtained from Momentive Performance Materials, Inc.) was added. After reacting for another 101 minutes the mixture had viscosity of 95300 cP and a color 18 Pt—Co. The scavenging package (7.96 grams of a solution consisting of 78.9 parts by weight of vinyltrimethoxysilane, 16.6 parts by weight of ε-caprolactam and 4.5 parts by weight of 2-pyrrolidone) was charged. The mixture was cooled slowly. The final product viscosity was 83500 cP at 25° C. and the product had color of 21 Pt—Co. A sample of the product was heated for 4 days at 80° C. after which it had color 30 Pt—Co.

Example 6

Batch Process for Preparation of Moisture Curable-Silylated Polyurethane Polymer Using a Hinder Phenolic Stabilizer and Methanol Scavenging Agent Into a four-neck 500 mL round bottom flask equipped with an overhead mechanical agitator, nitrogen line, stopper and thermocouple were charged polyol poly(propylene oxide) diol (328.6 g of the HMBT-120 obtained from Zhejiang Huangma Chemical) and hindered phenolic stabilizer (1.66 g of Irganox 1135 obtained from BASF). The mixture was dried by sparging with nitrogen while heating at 80° C. with a heating mantle for ~60 minutes to a water content of 38 ppm. The mixture was cooled to 72° C. under a nitrogen blanket. A solution of catalysts (240 μL solution of 10 weight percent dibutyltin dilaurate, Fomrez SUL-4, in toluene) was charged and mixed for ~10 minutes. The chain extension agent, isophorone diisocyanate (3.33 grams of Desmodur I obtained from Bayer) was charged and the reaction mixture was heated for 79 minutes until the mixture contained 0.04% isocyanate (as NCO) and the viscosity of the mixture was 33400 cP at 25° C. The silylating agent, 3-isocyanatopropyltrimethoxysilane (6.66 g of the Silquest*A-Link 35 silane obtained from Momentive Performance Materials, Inc.) was added. The temperature was increased to 85° C. When the mixture contained 0.04% isocyanate and had viscosity of 61800 cP, the scavenging package (6.56 grams of a mixture of vinyltrimethoxysilane (Silquest* A-171 silane obtained from Momentive Performance Materials, Inc.) and methanol (5.7 weight percent methanol)) was charged. The mixture was cooled slowly. The final product viscosity was 55200 cP at 25° C. and the product had color 25 Pt—Co. A sample of the product was heated for 4 days at 80° C. after which it had color 61 Pt—Co.

Example 7

Batch Process for Preparation of Moisture Curable-Silylated Polyurethane Polymer Using a Hinder Phenolic Stabilizer and ε-Caprolactam and 2-Pyrrolidone Scavenging Agents Into a four-neck 1000 mL round bottom flask equipped with an overhead mechanical agitator, nitrogen line, stopper and thermocouple were charged the polyol poly(propylene oxide) diol (645.5 grams of HMBT-120 obtained from Zhejiang Huangma Chemical) and hindered phenolic stabilizer (6.53 g of Irganox 1135 obtained from BASF). The mixture was dried by sparging with nitrogen while heating at 80° C. with a heating mantle for ~240 minutes. The color of the mixture was 11 Pt—Co. The mixture was heated to 150° C. under a nitrogen blanket and held for ~120 minutes at which point the color of the mixture was 25 Pt—Co. A solution of catalysts (756 μL of a solution containing 10 weight percent dibutyltin dilaurate (Fomrez SUL-4, Momentive Performance Materials, Inc.) in toluene) was charged and mixed for ~54 minutes at which point the color was 33 Pt—Co. The chain extension agent, isophorone diisocyanate (4.72 grams of Desmodur I obtained from Bayer) was charged and the mixture was heated for 168 minutes until the viscosity of the mixture was 54400 cP at 25° C. The mixture was cooled at which point it had viscosity 55600 cP at 25° C., a color 44 Pt—Co and contained 0.04% isocyanate. The reaction intermediate (259.4 grams) was transferred to a 500 mL flask for further processing. The reaction intermediate was sparged with nitrogen at 62-80° C. for 86 minutes to remove any water that might have been absorbed during transfer to the smaller flask. At 80° C., the silylating agent, 3-isocyanatopropyltrimethoxysilane (5.83 grams of Silquest*A-Link 35 silane obtained from Momentive Performance Materials, Inc.) was added and reacted for 196 minutes until the mixture contained 0.01% isocyanate and had viscosity 64900 cP of 25° C. and a color 45 Pt—Co. Finally, a scavenging package (6.17 grams of 78.9 parts by weight vinyltrimethoxysilane (Silquest*A-171 silane obtained from Momentive Performance Materials, Inc.), 16.6 parts by weight ε-caprolactam (obtained from Aldrich) and 4.5 parts by weight 2-pyrrolidone (obtained from Aldrich)) was charged. The mixture was then allowed to cool slowly to room temperature. The product had final viscosity 52200 cP at 25° C. and a color 50 Pt—Co.

TABLE 3

Color Measurement of SPUR using different stabilizers

| | Irganox 1135 (phr) | Doverphos 6 (phr) | Color as made, Pt—Co | Color at ageing at 80° C. for 4 days, Pt—Co |
|---|---|---|---|---|
| Example 4 | 0.5 | 0.5 | 14 | 22 |
| Example 5 | 0.5 | 0.56 | 18 | 30 |
| Example 6 | 0.5 | 0 | 25 | 61 |
| Example 7 | 1 | 0 | 50 | N/A |

Example 8

The Effect of Scavenging Package on the Moisture-Curable Silylated Polyurethane Polymer Made by a Continuous Process The continuous process for moisture-curable silylated polyurethane polymer was prepared using reactor sequence described in FIG. 5 and with the temperatures for the chain extension was about 151° C. and silylating reaction was about 140° C. The poly(propylene oxide) diol (polyol obtained from Zhejiang Huangma Chemical with the trade name HMBT-120, hydroxyl number of 9.90, number average molecular weight of 11,300 grams/mole) with was pumped from reservoir (10) into a feed line and transported to mixer (70) at a rate of 756.7 grams per minute. The dibutyltin dilaurate catalyst (Fomrez SUL-4, obtained from Momentive Performance Materials, Inc.), hindered phenol (Irganox 1135 obtained from BASF) and triisodecyl phosphite (Doverphos 6 obtained from Dover Chemical) were added to mixer (70) at a rate of 0.082 gram/minute, 3.783 grams/minute and 3.783 grams/minute, respectively, where these ingredients were transported as a catalyst and stabilizer mixture stored in reservoir (60a) through feed line (61). The polyol, catalyst and stabilizers were mixed and then transported from the mixer (70) to a heat exchanger (80) to heat the mixture of polyol, catalyst and stabilizers to the chain extension temperature. The heated mixture of polyol, catalyst and stabilizers was transported to a second mixer (21) were isophorone diisocyanate (Desmodur I obtained from Bayer) was pumped from reservoir (60b) was added at a rate of 5.71 grams/minute to the second mixer (21) by means of a feedline (62) and mixed. The mixture of polyol, catalyst, stabilizers and diisocyanate was transported chain extension reaction unit (20), a tubular reaction unit with static mixer, and reacted for about 25 minutes. The chain extension reaction product was transported to a third mixer (31) and 3-isocyanatopropyltrimethoxysilane (Silquest* A-Link 35 obtained from Momentive Performance Materials, Inc.) was pumped from reservoir (60c) to the mixer (31) by means of a feed line (63) at a rate of 16.94 grams/minute and then transported to a silylation reaction unit (30) equipped with backmixing loop (33) and pump (34). The backmixing ratio was 0.5 and the average reaction time was 7 minutes. The silylation reaction product was transported from silylation reaction unit (30) to a fourth mixer where one of the scavenging package was added at a rate of 19.93 grams/mole and mixed. The scavenging package was added at a rate so that the amounts were 0.44 weight percent ε-caprolactam, 0.12 weight percent 2-pyrrolidone and 2.0 weight percent vinyltrimethoxysilane, based on the total weight of the stabilizer package, silylated polymer and scavenging package. The mixture containing the scavenging package was transported a quenching reaction unit (40), a tubular reaction unit equipped with static mixers, and reacted for about 4 minutes. The second reaction product was then removed from the quenching reaction unit (40) and transported to the outlet where it was cooled and analyzed. The isocyanate concentration (NCO) was measured at the end of the reaction by titration. The data are presented in Table 5.

Example 9

The Effect of Scavenging Package on the Moisture-Curable Silylated Polyurethane Polymer Made by a Continuous Process Example 9 was a repeat of Example 8. The data are presented in Table 5.

Example 10

The Effect of Scavenging Package on the Moisture-Curable Silylated Polyurethane Polymer Made by a Continuous Process The moisture-curable silylated polyurethane polymer was prepared in accordance with Example 8, except that the scavenging package was added to the mixer at a rate of 16.65 grams/minute. The scavenging package was added at a rate so that the amounts were 0.12 weight percent 2-pyrrolidone and 2.0 weight percent vinyltrimethoxysilane, based on the total weight of the stabilizer package, silylated polymer and scavenging package. The isocyanate concentration (NCO) was measured at the end of the reaction by titration. The data are presented in Table 5.

Example 11

The Effect of Scavenging Package on the Moisture-Curable Silylated Polyurethane Polymer Made by a Continuous Process The moisture-curable silylated polyurethane polymer was prepared in accordance with Example 8, except that the scavenging package was added to the mixer at a rate of 16.65 grams/minute. The scavenging package was added at a rate so that the amounts were 0.18 weight percent 2-pyrrolidone and 2.0 weight percent vinyltrimethoxysilane, based on the total weight of the stabilizer package, silylated polymer and scavenging package. The isocyanate concentration (NCO) was measured at the end of the reaction by titration. The data are presented in Table 5.

Examples 12-15

The Effect of Scavenging Package on the Moisture-Curable Silylated Polyurethane Polymer Made by a Continuous Process The moisture-curable silylated polyurethane polymer was prepared in accordance with Example 8, except that the scavenging package was added to the mixer at a rate of 16.65 grams/minute. The scavenging package was added at a rate so that the amount of vinyltrimethoxysilane was 2.0 weight percent vinyltrimethoxysilane, based on the total weight of the stabilizer package, silylated polymer and scavenging package. The isocyanate concentration (NCO) was measured at the end of the reaction by titration. The preparation was repeated three times. The data are presented in Table 5.

TABLE 5

Experimental results of quenchers on the continuous process

| Example | NCO wt % at the end of reaction |
|---|---|
| 8 | 0.01 |
| 9 | 0 |
| 10 | 0 |
| 11 | 0.01 |
| 12 | 0.06 |
| 13 | 0.12 |
| 14 | 0.07 |
| 15 | 0.07 |

Examples 8 to 11 illustrate that the cyclic lactams are effective quenchers for the residual isocyanate, but if the reaction are quenched with only the vinyltrimethoxysilane, the final product has residual isocyanate groups.

Example 16

The Effect of Phosphite Stabilizing Agent on Continuous Process for Making Moisture-Curable Silylated Polyurethane Polymer The moisture-curable silylated polyurethane polymer was made in accordance with Example 8, except that the mixture of catalyst and stabilizer consisted of dibutyl tin dilaurate and triisodecyl phosphite was added at a rate so that the dibutyl tin dilaurate was 20 ppm Sn and the phosphite was 0.5 weight percent, based on the weight of the polyol.

The color was measured of freshly made material and after ageing the material at 80° C. for 4 days. BYK Gardner LCS IV was used for the measurement. The data are presented in Table 6.

Example 17

The Effect of a Mixture of Hindered Phenol and Phosphite Stabilizing Agents on Continuous Process for Making Moisture-Curable Silylated Polyurethane Polymer The moisture-curable silylated polyurethane polymer was made in accordance with Example 8, except that the mixture of catalyst and stabilizer consisted of dibutyl tin dilaurate, hinder phenol (Irganox 1135 from BASF) and triisodecyl phosphite (Doverphos 6 from Dover Chemicals) was added at a rate so that the dibutyl tin dilaurate was 20 ppm Sn, the hindered phenol was 0.5 weight percent and the phosphite was 0.5 weight percent, based on the weight of the polyol.

The color was measured of freshly made material and after ageing the material at 80° C. for 4 days. BYK Gardner LCS IV was used for the measurement. The data are presented in Table 6.

Comparative Example I and II

The Effect of Having No Stabilizing Agents on Continuous Process for Making Moisture-Curable Silylated Polyurethane Polymer The moisture-curable silylated polyurethane polymer was made in accordance with Example 8, except that catalyst and stabilizer consisted of dibutyl tin dilaurate and hinder phenol (Irganox 1135 from BASF) was added at a rate so that the dibutyl tin dilaurate was 20 ppm Sn, the hindered phenol was 1.0 weight percent, based on the weight of the polyol.

The color was measured of freshly made material and after ageing the material at 80° C. for 4 days. BYK Gardner LCS IV was used for the measurement. The preparation was repeated. The data are presented in Table 6.

TABLE 6

Experimental results of color effect of stabilizer packages on the continuous process

| Example No. | Irganox 1135 (phr) | Doverphos 6 (phr) | Color immediately after reaction (Pt—Co) | Color after ageing for 4 days at 80° C. (Pt—Co) |
|---|---|---|---|---|
| 14 | 0 | 0.5 | 21 | 21 |
| 15 | 0.5 | 0.5 | 29 | 26 |
| I | 1 | 0 | 40 | 96 |
| II | 1 | 0 | 38 | 86 |

The data in Table 6 illustrates that in a continuous process for making moisture-curable silylated polymers, the stabilizer package need to contain a phosphite stabilizer in order to generated products having low color and color stability because of the higher temperatures employed in the process.

The invention claimed is:

1. A quenched silylated polymer having the general Formula (11):

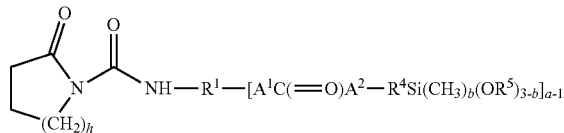

(11)

each occurrence of $A^1$ is a functional group selected from the group consisting of —O—, —S— and —NH—;
each occurrence of $A^2$ is a functional group selected from the group consisting of —S—, —NR$^6$, where $R^6$ is selected from the group consisting of hydrogen, an alkyl group containing from 1 to about 10 carbon atoms, cycloalkyl group containing from about 5 to about 10 carbon atoms, an aralkyl group containing from about 7 to about 10 carbon atoms, phenyl and —CH[(C(=O)OR$^7$]CHR$^8$C(=O)OR$^7$, where $R^7$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms and $R^8$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms;
$R^1$ is an organic group containing from about 50 to about 4,000 carbon atoms and at least one functional group selected from group consisting of —O—, —S—, —OC(=O)NH—, —R$^2$NC(=O)NH—, —C(=O)O—, —OC(=O)O—, —OCHR$^2$O—, —C(=O)NR$^2$— and —NR$^2$—, wherein each occurrence of $R^2$ is independently hydrogen, an alkyl group containing from 1 to about 6 carbon atoms or phenyl, preferably hydrogen;

$R^4$ is a divalent alkylene group containing from 1 to about 10 carbon atoms, a cycloalkylene group containing from about 5 to about 10 carbon atoms and an arylene group containing from about 6 to about 10 carbon atoms;

each occurrence of $R^5$ is an alkyl group of from 1 to about 18 carbon atoms or a —$R^9(OR^{10})_cOR^{11}$, where $R^9$ is an alkyl group of from 1 to about 18 carbon atoms, $R^{10}$ is a divalent alkylene group of from about 2 to about 4 carbon atoms, and $R^{11}$ is an alkyl group of from 1 to about 10 carbon atoms or —C(=O)$R^{12}$, where $R^{12}$ is hydrogen, or an alkyl group of from 1 to about 6 carbon atoms, and the subscripts a, b, c and h are integers where a is 2 to about 5, b is 0 to about 2, c is 0 to about 5, and h is 1 to 6, with the proviso that when $A^1$ is —O— or —S—, then $A^2$ is —NH—.

2. The quenched silylated polymer of claim 1, wherein $R^1$ is derived from poly(oxyethylene) diols, the poly(oxypropylene) diols, poly(oxyethylene-oxypropylene)diols, polyoxyalkylene triols, polytetramethylene glycols, polyacetals, polyhydroxy polyacrylates, polyhydroxy polyester amides, polyhydroxy polythioethers, polycaprolactone diols or polycaprolactone triols.

3. The quenched silylated polymer of claim 1, wherein $R^1$ is derived from a poly(alkylene oxide) diol.

4. The quenched silylated polymer of claim 2, wherein poly(oxypropylene)diol has a number average molecular weight of from 4,000 to 20,000 grams/mole.

5. The quenched silylated polymer of claim 1, wherein $R^1$ is derived from a diisocyanate extended poly(propylene oxide) diol.

6. The quenched silylated polymer of claim 1, wherein $R^4$ is —$CH_2$—, —$CH_2CH_2$—, —$CH_2CH_2CH_2$— or —$CH_2CH(CH_3)CH_2$—.

7. The quenched silylated polymer of claim 1, wherein $R^5$ is —$CH_3$ or —$CH_2CH_3$.

8. The quenched silylated polymer of claim 1, wherein $A^1$ is —O— or —NH—.

9. The quenched silylated polymer of claim 1, wherein $A^2$ is —NH— or —$NCH_3$—.

10. The quenched silylated polymer of claim 1, where a is 2.

11. The quenched silylated polymer of claim 1, where h is 1 or 2.

12. The quenched silylated polymer of claim 4, wherein $R^4$ is —$CH_2$—, —$CH_2CH_2$—, —$CH_2CH_2CH_2$— or —$CH_2CH(CH_3)CH_2$—; $R^5$ is —$CH_3$ or —$CH_2CH_3$; $A^1$ is —O— or —NH—l—; $A^2$ is —NH— or —$NCH_3$—; and a is 2.

13. The quenched silylated polymer of claim 5, wherein $R^4$ is —$CH_2$—, —$CH_2CH_2$—, —$CH_2CH_2CH_2$— or —$CH_2CH(CH_3)CH_2$—; $R^5$ is —$CH_3$ or —$CH_2CH_3$; $A^1$ is —O— or —NH—; $A^2$ is —NH— or —$NCH_3$—; and a is 2.

14. A silylated polymer composition comprising:

(i) a quenched silylated polymer having silylated polymer having the general Formula (11):

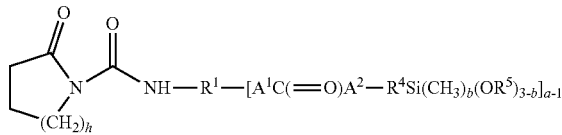

(11)

each occurrence of $A^1$ is a functional group selected from the group consisting of —O—, —S— and —NH—;

each occurrence of $A^2$ is a functional group selected from the group consisting of —S—, —$NR^6$, where $R^6$ is selected from the group consisting of hydrogen, an alkyl group containing from 1 to about 10 carbon atoms, cycloalkyl group containing from about 5 to about 10 carbon atoms, an aralkyl group containing from about 7 to about 10 carbon atoms, phenyl and —CH[(C=O)$OR^7$]$CHR^8$C(=O)$OR^7$, where $R^7$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms and $R^8$ is an alkyl group of from 1 to about 10 carbon atoms, a cycloalkyl group of from about 5 to about 10 carbon atoms, an aryl group of from about 6 to about 10 carbon atoms, and aralkyl group of from about 7 to about 10 carbon atoms;

$R^1$ is an organic group containing from about 50 to about 4,000 carbon atoms and at least one functional group selected from group consisting of —O—, —S—, —OC(=O)NH—, —$R^2$NC(=O)NH—, —C(=O)O—, —OC(=O)O—, —OCH$R^2$O—, —C(=O)$NR^2$— and —$NR^2$—, wherein each occurrence of $R^2$ is independently hydrogen, an alkyl group containing from 1 to about 6 carbon atoms or phenyl, preferably hydrogen;

$R^4$ is a divalent alkylene group containing from 1 to about 10 carbon atoms, a cycloalkylene group containing from about 5 to about 10 carbon atoms and an arylene group containing from about 6 to about 10 carbon atoms;

each occurrence of $R^5$ is an alkyl group of from 1 to about 18 carbon atoms or a —$R^9(OR^{10})_cOR^{11}$, where $R^9$ is an alkyl group of from 1 to about 18 carbon atoms, $R^{10}$ is a divalent alkylene group of from about 2 to about 4 carbon atoms, and $R^{11}$ is an alkyl group of from 1 to about 10 carbon atoms or —C(=O)$R^{12}$, where $R^{12}$ is hydrogen, or an alkyl group of from 1 to about 6 carbon atoms, and the subscripts a, b, c and h are integers where a is 2 to about 5, b is 0 to about 2, c is 0 to about 5, and h is 1 to 6, with the proviso that when $A^1$ is —O— or —S—, then $A^2$ is —NH—; and (ii) a stabilizing package comprising a phosphite stabilizer.

15. The silylated polymer composition of claim 14, wherein the phosphite stabilizer has the general Formula (7):

(7)

wherein
each occurrence of $R^{20}$ is independently selected from the group consisting of a monovalent hydrocarbon containing from 1 to about 25 carbon atoms, a monovalent hydrocarbon containing from 1 to about 25 carbon atoms and at least one heteroatom selected from the group consisting of oxygen atom, nitrogen atoms and sulfur atom, and a polyvalent hydrocarbon containing from 1 to about 25 carbon atoms in which at least one carbon atom is bonded to the oxygen of the oxygen-phosphorus group and at least one carbon atom is covalently bonded to a carbon atom of the $R^{21}$ group;

each occurrence of $R^{21}$ is independently selected from the group consisting of a monovalent hydrocarbon containing from 1 to about 25 carbon atoms, a monovalent hydrocarbon containing from 1 to about 25 carbon atoms and at least one heteroatom selected from the group consisting of oxygen atom, nitrogen atoms and sulfur atom, and a polyvalent hydrocarbon containing from 1 to about 25 carbon atoms in which at least one carbon atom is bonded to the oxygen of the oxygen-phosphorus group and at least one carbon atom is covalently bonded to a carbon atom of the $R^{20}$ group; and each occurrence of $R^{22}$ is independently a monovalent hydrocarbon containing 1 to about 25 carbon atoms and optionally containing at least one heteroatom selected from the group consisting of oxygen atom, nitrogen atoms and sulfur atom.

16. The silylated polymer composition of claim 15, wherein $R^{20}$, $R^{21}$ and $R^{22}$ groups that are monovalent alkyl groups, aryl groups or alkyl-substituted aromatic hydrocarbon groups.

17. The silylated polymer composition of claim 16, wherein the phosphite stabilizer is tris(2,4-di-tert-butylphenyl)phosphite; 2-(2,4,8,10-tetratert-butylbenzo[d][1,3,2]benzodioxaphosphepin-6-yl)oxy-N,N-bis[2-(2,4,8,10-tetra-tert-butylbenzo[d][1,3,2]benzodioxaphosphepin-6-yl)oxyethyl]ethanamine; bis(2,4-di-tert-butyl-6-methylphenyl)-ethyl-phosphite; 3,9-bis-(2,4-di-tert-butyl-phenoxy)-2,4,8,10-tetraoxa-3,9-diphospha-spiro[5.5]undecane; or mixtures thereof.

18. The silylated polymer composition of claim 16, wherein the stabilization package comprises a sterically hindered phenol.

19. The silylated polymer composition of claim 18, wherein the sterically hindered phenol has the general Formula (5):

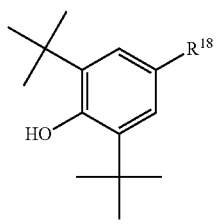

(5)

wherein each occurrence of $R^{18}$ is a monovalent or polyvalent organic radical of from 1 to about 50 carbon atoms and optionally containing substituents selected from group consisting of a hydroxyl group —OH; an amide group —C(=O)N(-)$_2$; an ester group —C(=O)O—; an isocyanurate group

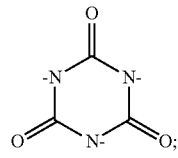

an ether group —O—; an amine group —NH—; a hydrazide group —C(=O)N(-)NH(-)$_2$—; a sulfide group, —S—; and combinations thereof.

20. The silylated polymer composition of claim 18, wherein the sterically hindered phenol has the general Formula (6):

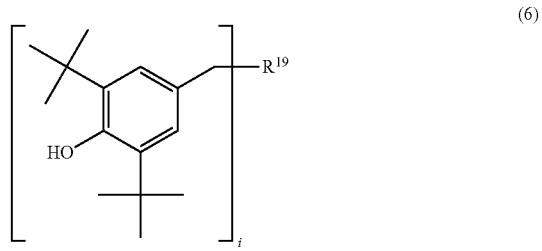

(6)

wherein
$R^{19}$ is a divalent, trivalent or tetravalent organic group of from 1 to about 50 carbon atoms and optionally containing substituents selected from group consisting of a hydroxyl group —OH; an amide group —C(=O)N(-)$_2$; an ester group —C(=O)O—; an isocyanurate group

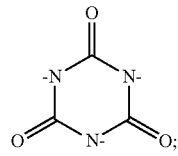

an ether group —O—; an amine group —NH—; a hydrazide group —C(=O)N(-)NH(-)$_2$—; a sulfide group —S—; and combination thereof; and the subscript i is an integer of from about 2 to about 4.

21. The silylated polymer composition of claim 16, wherein the sterically hindered phenol is 4-[[3,5[(3,5-ditert-butyl-4-hydroxyphenyl)methyl]-2,4,6-trimethylphenyl]methyl]-2,6-ditert-butylphenol; octadecyl 3-(3,5-ditert-butyl-4-hydroxyphenyl)propanoate; 3-(3,5-ditert-butyl-4-hydroxyphenyl)-N'-[3-(3,5-ditert-butyl-4-hydroxyphenyl)propanoyl]propanehydrazide; ethylenebis(oxyethylene)bis-3,5-tert-butyl-4-hydroxy-m-tolyl)-propionate; pentaerythritol tetrakis(3-(3,5-di-tert-4-hydroxyphenyl)propionate; thiodiethylene bis[3-(3,5-di-tert-butyl-4-hydroxyphenyl)propionate-N,N'-hexane-1,6-diylbis(3-(3,5-di-tertbutyl-4-hydroxylphenylpropionamide); 1,3,5-tris-(3,5-di-tert-butyl-4-hydroxybenzyl)-1,3-5-triazine-2,4,6(1H,3H,5H—)-trione; 3,5-di-tert-buytl-4-hydroxy-toluene; 4,4-methylene-bis(3,5-di-tert-butylphenol); or mixtures thereof.

22. The silylated polymer composition of claim 14, further comprising at least one other silylated polymer where the other silylated polymer has not been quenched.

\* \* \* \* \*